(12) United States Patent
Baharav et al.

(10) Patent No.: US 11,932,386 B2
(45) Date of Patent: Mar. 19, 2024

(54) AIR VEHICLE AND METHOD OF OPERATION OF AIR VEHICLE

(71) Applicant: ISRAEL AEROSPACE INDUSTRIES LTD., Lod (IL)

(72) Inventors: Ehud Baharav, Ramat Gan (IL); Avner Volovick, Petach Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 287 days.

(21) Appl. No.: 17/296,427

(22) PCT Filed: Nov. 20, 2019

(86) PCT No.: PCT/IL2019/051267
§ 371 (c)(1),
(2) Date: May 24, 2021

(87) PCT Pub. No.: WO2020/105045
PCT Pub. Date: May 28, 2020

(65) Prior Publication Data
US 2022/0009626 A1  Jan. 13, 2022

(30) Foreign Application Priority Data

Nov. 25, 2018 (IL) .......................................... 263301

(51) Int. Cl.
*B64C 29/00* (2006.01)
*B64C 39/04* (2006.01)

(52) U.S. Cl.
CPC ...... *B64C 29/0033* (2013.01); *B64C 29/0025* (2013.01); *B64C 39/04* (2013.01)

(58) Field of Classification Search
CPC .................. B64C 29/0033; B64C 29/0025
See application file for complete search history.

(56) References Cited

U.S. PATENT DOCUMENTS

| 3,181,810 A | 5/1965 | Olson |
| 3,572,612 A * | 3/1971 | Irbitis ................. B64C 29/0033 244/7 C |

(Continued)

FOREIGN PATENT DOCUMENTS

| ES | 2327987 A1 | 11/2009 |
| WO | 2010/137016 A2 | 12/2010 |
| WO | 2015/056124 A1 | 4/2015 |

*Primary Examiner* — Tien Q Dinh
*Assistant Examiner* — William L Gmoser
(74) *Attorney, Agent, or Firm* — Vorys, Sater, Seymour and Pease LLP; Anthony P. Venturino; Maryellen Feehery Hank

(57) ABSTRACT

An air vehicle has an airframe, aerodynamic lift-generating wings, and a propulsion system. The propulsion system provides propulsion to the air vehicle in powered aerodynamic flight mode and in vectored flight mode, and stability and control in vectored flight mode. The propulsion system includes a first set of non-pivotable first propulsion units, arranged in polygonal arrangement with respect to the airframe, enclosing the air vehicle center of gravity, providing a fixed vertical thrust vector and an aggregate vertical thrust sufficient for enabling vectored flight mode. The propulsion system includes a second set of pivotable second propulsion units, arranged in spaced relationship with respect to the center of gravity, and provide vectored control moments to the air vehicle in three rotational degrees of freedom. The second propulsion units enable angular displacement of the respective thrust vectors at least between a respective vertical position and a respective horizontal position, and provide at least an aggregate horizontal thrust sufficient for providing powered aerodynamic flight mode.

35 Claims, 9 Drawing Sheets

(56) References Cited

U.S. PATENT DOCUMENTS

| | | | |
|---|---|---|---|
| 5,419,514 A | | 5/1995 | Ducan |
| 6,464,166 B1 | | 10/2002 | Yoeli |
| 6,488,232 B2 | | 12/2002 | Moshier |
| 6,892,979 B2 | | 5/2005 | Milde, Jr. |
| 7,267,300 B2 | | 9/2007 | Heath et al. |
| 7,472,863 B2 | | 1/2009 | Pak |
| 7,961,811 B2 | | 6/2011 | Miyoshi et al. |
| 10,450,062 B1 | * | 10/2019 | Bova ................... B64C 39/024 |
| 2002/0113165 A1 | | 8/2002 | Moshier |
| 2003/0062442 A1 | | 4/2003 | Milde, Jr. |
| 2003/0080242 A1 | | 5/2003 | Kawai |
| 2004/0094662 A1 | | 5/2004 | Sanders, Jr. et al. |
| 2006/0226281 A1 | | 10/2006 | Walton |
| 2007/0057113 A1 | | 3/2007 | Parks |
| 2008/0054121 A1 | | 3/2008 | Yoeli |
| 2010/0301168 A1 | * | 12/2010 | Raposo ................ G05D 1/0858 |
| | | | 244/171.2 |
| 2015/0136897 A1 | | 5/2015 | Seibel et al. |
| 2015/0314867 A1 | | 11/2015 | Razroev |
| 2016/0236774 A1 | | 8/2016 | Niedzballa |
| 2016/0244157 A1 | | 8/2016 | Welsh |
| 2016/0304194 A1 | * | 10/2016 | Bevirt ................. B64C 29/0033 |
| 2017/0233069 A1 | | 8/2017 | Apkarian |
| 2020/0164976 A1 | * | 5/2020 | Lovering ............... B64U 70/80 |

* cited by examiner

AIR VEHICLE AND METHOD OF OPERATION OF AIR VEHICLE

TECHNOLOGICAL FIELD

The presently disclose subject matter relates to vertical take-off and landing (VTOL) air vehicle configurations, short take-off and landing (STOL) air vehicle configurations, and vertical/short take-off and landing (V/STOL) air vehicle configurations, and methods for operating the same.

BACKGROUND

There are at least four main categories of VTOL or V/STOL vehicles: where the vehicle has a single powerplant adapted for producing vertical as well as horizontal thrust; where the vehicle has separate powerplants for producing vertical and horizontal thrust; where the vehicle has a powerplant for vertical and horizontal thrust, plus a supplemental powerplant for vertical thrust; other configurations.

In recent years, there have been many proposals for VTOL configurations based on electric propulsion, and some of these so-called eVTOL concepts include the following: Aurora, Cora, E-Hang, Lilium, Uber ECRM, EmbraerX, Airbus Vahana, eVolo, Airbus Helicopters, XTi.

By way of general background, the following publications disclose various aircraft configurations.

WO 2010/137016, assigned to the present assignee, a system and method are disclosed for providing propulsion and control to an air vehicle, and for operating the vehicle, include at least three propulsion units that provide vertical thrust for vectored thrust flight, in which at least one or two of the propulsion units also provide thrust for vectored thrust cruising or aerodynamic flight by suitably tilting the respective propulsion units for changing the thrust vector thereof. At the same time, the three or more propulsion units are operated to generate controlling moments to the air vehicle about three orthogonal axes, pitch, roll and yaw, during vectored thrust flight (hover, cruising, etc.) or during aerodynamic flight for controlling the vehicle.

U.S. Pat. No. 7,267,300 discloses an aircraft comprising an airframe, a power plant mounted on the airframe, and at least two propellers rotatably mounted on the airframe and powered by the power plant for moving the aircraft in a generally forward direction during operation of the propellers. Also, the aircraft includes at least two counter-rotatable fan sets mounted on the airframe and powered by the power plant for providing upward lift to the aircraft during operation of the fan sets.

US 2006/0226281 discloses a vertical take-off and landing vehicle comprised of a fuselage having a front, a rear, and two lateral sides and a set of four thrusters set to the front, the left, the right, and the rear of said fuselage. The thrusters are comprised of a set of two counter rotating propellers both of which creates lift. The two counter rotating propellers cancel out the torque effect normally created by using only one propeller. The ducted fan units are movable between a first position in which they provide vertical lift and a second position in which they provide horizontal thrust using a set of servos and gears.

U.S. Pat. No. 7,472,863 discloses a vertical takeoff and landing (VTOL) aircraft design comprising one internal combustion engine able to spit shaft power to four fan units. The fan units further employ counter rotating fan blades for stability. Separate horizontal and vertical tilting mechanisms delivered to the fan units are additionally disclosed. A variation in design is further included wherein electric motors provide the necessary shaft power.

US 2004/094662 discloses an Unusual Flying Object said to have VTOL capabilities including forward flight with a Linear Induction Magnetic Bearings power drive.

U.S. Pat. No. 7,461,811 discloses a STOL or VTOL winged aircraft comprising a fuselage and a fixed wing attached to the fuselage and extending outward from the two lateral sides thereof, forming one wing component extending outward from one side of the fuselage and a second wing component extending outward from the opposite side of the fuselage. At least one "thruster" is disposed in each wing component to provide vertical lift to the aircraft when the aircraft is stationary or moving forward only slowly. The thruster includes a shaft mounted for rotation in the respective wing component and extending substantially parallel to the wing axis and a plurality of fan blades attached to the shaft for movement of air.

US 2003/062442 discloses a personal aircraft said to be capable of vertical take-off and landing and comprises a passenger compartment having a front, a rear and two sides, and a plurality of independently powered thrusters attached to the outer periphery of the compartment. At least three thrusters are disposed on each side of the compartment. The thrusters, which are preferably ducted fan units, are capable of providing a vertically upward force to the compartment.

U.S. Pat. No. 6,892,979 discloses a personal aircraft said to be capable of vertical take-off and landing which comprises: (a) a fuselage having a front end, a rear end and two lateral sides, the fuselage having a central longitudinal axis extending from the front end to the rear end, between the two lateral sides; (b) at least one, and preferably two or more, ducted fans, each arranged in the fuselage between the front end and the rear end and between the two lateral sides, for providing vertical lift; and (c) at least one substantially horizontal wing attached to each side of the fuselage and extending outward with respect to the central longitudinal axis.

U.S. Pat. No. 6,464,166 discloses a vehicle, particularly a VTOL air vehicle, including a duct carried by the vehicle frame with the longitudinal axis of the duct perpendicular to the longitudinal axis of the vehicle frame; a propeller rotatably mounted within the duct about the longitudinal axis of the duct to force an ambient fluid, e.g. air, therethrough from its inlet at the upper end of the duct through its exit at the lower end of the duct, and thereby to produce an upward lift force applied to the vehicle; and a plurality of parallel, spaced vanes pivotally mounted to and across the inlet end of the duct about pivotal axes perpendicular to the longitudinal axis of the duct and substantially parallel to the longitudinal axis of the vehicle frame. The vanes are selectively pivotal to produce a desired horizontal force component to the lift force applied to the vehicle. Various vane arrangements are disclosed for producing side, roll, pitch and yaw movements of the vehicle.

US 2003/080242 discloses an aircraft that is mounted with turbofan engines with separate core engines having fan engines used commonly for cruising and lifting up, through enabling to direct the thrust from fan engines to all directions by supporting the fan engines composing the turbofan engines with separate core engines in biaxial support so that the fan engines are rotatable in the direction of pitching and rolling, the fan engines are mounted on both sides of each of front and rear wings.

US 2007/0057113 discloses a system and method are provided for a STOL/VTOL aircraft that stores required take-off power in the form of primarily an electric fan engine, and secondarily in the form of an internal combustion engine.

US 2008/0054121 discloses a VTOL vehicle comprising a fuselage having forward and aft propulsion units, each propulsion unit comprising a propeller located within an open-ended duct wall wherein a forward facing portion of the duct wall of at least the forward propulsion unit is comprised of at least one curved forward barrier mounted for horizontal sliding movement to open the forward facing portion to thereby permit air to flow into the forward facing portion when the VTOL vehicle is in forward flight.

US 2002/113165 discloses a vertical takeoff aircraft that uses ducted fans for lift and propulsion. The fans are attached to an airframe and are disposed on opposite lateral sides of the aircraft. The thrust from the each of the fans may be deflected in different directions by using vanes with flaps disposed within the ducts of the fans, as well as by tilting the entire fan assemblies.

U.S. Pat. No. 6,488,232 discloses a single passenger aircraft configured to vertically take-off and land. An airframe is configured to support the passenger in an upright position during take-off and landing and during flight. The aircraft includes a pair of propulsion devices that are mounted on an airframe above the level of the pilot. A set of hand operated control devices are mechanically linked to the propulsion devices for varying the orientation of the propulsion devices during flight.

GENERAL DESCRIPTION

According to a first aspect of the presently disclosed subject matter there is provided an air vehicle configured for being operated in vectored flight mode and in powered aerodynamic flight mode, the air vehicle having a longitudinal axis and center of gravity, and comprising:
 an airframe comprising aerodynamic lift-generating wings for enabling operation of said air vehicle in said powered aerodynamic flight mode;
 a propulsion system, configured for providing propulsion to said air vehicle in said powered aerodynamic flight mode and said vectored flight mode, and for providing stability and control to said air vehicle in said vectored flight mode, and comprising a first set of first propulsion units and a second set of second propulsion units, wherein:
 said first set of first propulsion units comprising at least three said first propulsion units, said first propulsion units being arranged in polygonal arrangement with respect to the airframe, said polygonal arrangement enclosing the center of gravity when the air vehicle is viewed in plan view;
 said first propulsion units being non-pivotably attached with respect to said airframe to provide a fixed vertical thrust vector with respect thereto,
 said first set of first propulsion units configured to provide an aggregate vertical thrust sufficient for providing said vectored flight mode;
 said second set of second propulsion units comprising at least three said second propulsion units, each said second propulsion unit being arranged in spaced relationship with respect to the center of gravity when viewed in plan view, said second set of second propulsion units being further configured to provide vectored control moments to the air vehicle in three rotational degrees of freedom;
 said second propulsion units each being pivotably attached with respect to said airframe to enable angular displacement of a respective thrust vector at least between a respective vertical position and a respective horizontal position with respect thereto,
 said second set of second propulsion units configured to provide at least an aggregate horizontal thrust sufficient for providing said powered aerodynamic flight mode.

For example, said airframe comprises an empennage, and wherein said wings include a port wing and starboard wing.

Additionally or alternatively, for example, said first set of first propulsion units are operable to provide propulsion and an absence of stability and control to said air vehicle in said vectored flight mode.

Additionally or alternatively, for example, said first set of first propulsion units comprises two said first propulsion units forward of said wings.

Additionally or alternatively, for example, said first set of first propulsion units comprises four said first propulsion units. For example, said first set of first propulsion units comprises two said first propulsion units forward of said wings and two said first propulsion units aft of said wings.

Additionally or alternatively, for example, two said first propulsion units are on a starboard side of said center of gravity and wherein another two said first propulsion units are on a port side of said center of gravity.

Additionally or alternatively, for example, said second set of second propulsion units are operable to exclusively provide for said propulsion system said stability and control to said air vehicle in said vectored flight mode.

Additionally or alternatively, for example, said second set of second propulsion units are operable to provide propulsion to said air vehicle in said powered aerodynamic flight mode.

Additionally or alternatively, for example, said second set of second propulsion units comprises two aft said second propulsion units spaced aft of said wings.

Additionally or alternatively, for example, said second set of second propulsion units comprises two aft said second propulsion units spaced aft of said center of gravity.

Additionally or alternatively, for example, said second set of second propulsion units comprises four said second propulsion units. For example, said second set of second propulsion units comprises two aft said second propulsion units spaced aft of said center of gravity, one said aft second propulsion unit on a starboard side of said center of gravity and another said aft second propulsion units on a port side of said center of gravity.

Additionally or alternatively, for example, said second set of second propulsion units comprises two aft said second propulsion units pivotably mounted to said empennage.

Additionally or alternatively, for example, said empennage is in the form of a V-tail configuration, including a port stabilizer and starboard stabilizer, wherein one said aft said second propulsion unit is pivotably mounted to said port stabilizer and wherein another said aft said second propulsion unit is pivotably mounted to starboard stabilizer.

Additionally or alternatively, for example, said two aft second propulsion units are operable to exclusively provide said stability and control in pitch for said propulsion system in said vectored flight mode.

Additionally or alternatively, for example, said two aft second propulsion units are operable to provide said stability and control in at least one of yaw and roll for said propulsion system in said vectored flight mode.

Additionally or alternatively, for example, said two aft second propulsion units are separately operable to selectively control at least one of:
- a level of thrust generated by the respective said aft second propulsion unit; and
- a pivot angle the respective said aft second propulsion unit;
- to thereby generate control moments in any one of pitch, roll and yaw to provide said stability and control.

For example, said two aft second propulsion units are selectively pivotable co-rotationally, or for example said two aft second propulsion units are selectively pivotable counter-rotationally.

Additionally or alternatively, for example, said second propulsion units are pivotable at least between a vertical position and a horizontal position, wherein in said horizontal position at least some of said second propulsion units can be operated to provide thrust for propulsion in said powered aerodynamic flight mode, and wherein in said vertical position at least some of said second propulsion units can be operated to provide thrust for propulsion in said vectored flight mode.

Additionally or alternatively, for example, said second set of second propulsion units comprises two forward said second propulsion units pivotably mounted to said wings.

Additionally or alternatively, for example, one said forward said second propulsion unit is pivotably mounted to said port wing and wherein another said forward said second propulsion unit is pivotably mounted to starboard wing. For example, said two forward second propulsion units are operable to exclusively provide said stability and control in at least roll for said propulsion system in transition from said vectored flight mode to said aerodynamic flight mode. Additionally or alternatively, for example, said forward second propulsion units are operable to provide said stability and control in at least one of yaw and roll for said propulsion system in said vectored flight mode.

Additionally or alternatively, for example, said two forward second propulsion units are separately operable to selectively control at least one of:
- a level of thrust generated by the respective said forward second propulsion unit; and
- a pivot angle the respective said forward second propulsion unit;
- to thereby generate control moments in any one of pitch, roll and yaw to provide said stability and control.

For example, said two aft second propulsion units are selectively pivotable co-rotationally, or, for example said two aft second propulsion units are selectively pivotable counter-rotationally.

Additionally or alternatively, for example, said first propulsion units and said second propulsion units are electric first propulsion units and electric second propulsion units, respectively. For example, each said first propulsion unit comprises two electric motors each coupled to a respective first rotor, and wherein each said second propulsion units comprises two electric motors each coupled to a respective second rotor. For example, each said first rotor comprises at least one fixed pitch propeller, and wherein each said second rotor comprises at least one variable pitch propeller. Additionally or alternatively, for example, each said first rotor comprises a two-bladed propeller, and wherein each said second rotor comprises a three-bladed propeller. For example, each said two-bladed propeller is operated to be aligned and locked in a longitudinal direction parallel to said longitudinal axis in said powered aerodynamic flight mode.

Additionally or alternatively, for example, the air vehicle comprises a port boom affixed to said port wing and a starboard boom affixed to said starboard wing.

For example, said empennage is in the form of a V-tail configuration, including a port stabilizer and starboard stabilizer, wherein said V-tail is connected to the fuselage via a tail, wherein said port boom extends aft of the port wing and is fixedly connected to said port stabilizer, and wherein said starboard boom extends aft of the starboard wing and is fixedly connected to said starboard stabilizer. For example one said first propulsion unit is located on said port boom aft of the port wing, and wherein another said first propulsion unit is located on said starboard boom aft of the starboard wing. Additionally or alternatively, for example, said port boom extends forward of said port wing, and wherein said starboard boom extends forward of said starboard wing. For example, one said first propulsion unit is located on said port boom forward of the port wing, and wherein another said first propulsion unit is located on said starboard boom forward of the starboard wing.

Additionally or alternatively, for example, said first rotors have a first diameter, and said first rotors have a second diameter, wherein said first diameter is significantly greater than said second diameter.

Additionally or alternatively, for example, two said second propulsion units are pivotably mounted to said wings about respective pivot axes, wherein said pivot axes are aft to the center of gravity.

According to a second aspect of the presently disclosed subject matter there is provided method for operating an air vehicle, the air vehicle being as defined according to the aforesaid first aspect of the presently disclosed subject matter, the method comprising operating the air vehicle for VTOL take off.

For example, the method comprises the following steps:
(a) vectored thrust climb step, including:
  operating the propulsion system in vectored thrust mode to cause the air vehicle to lift off and climb from a surface using vertical thrust generated by the propulsion system;
  concurrently operating the second set of second propulsion units to exclusively provide stability and control to the air vehicle;
(b) transition step, including operating the second set of second propulsion units to provide a forward speed to the air vehicle and concurrently transition the air vehicle from vectored thrust flight mode to powered aerodynamic flight mode;
(c) aerodynamic flight step, including:
  operating the second set of second propulsion units to exclusively provide propulsion for powered aerodynamic flight mode.

For example, step (a) comprises operating the first set of first propulsion units to provide a nominal maximum thrust, such as to at least exceed a gross take-off weight of the air vehicle sufficiently to provide a predetermined climb rate.

For example step (a) comprises operating the second set of second propulsion units to provide a corresponding vertical thrust to accelerate the air vehicle to attain the predetermined climb rate.

Additionally or alternatively, for example, step (b) comprises:
  a first transition stage, in which the stability and control of the air vehicle is transferred from the second propulsion units to aerodynamic control surfaces of the air vehicle, and a second transition stage in which the lift functions are transferred from the first propulsion units and optionally the propulsion units to the wings of the air vehicle.

Additionally or alternatively, for example, said second transition stage starts during the first transition stage.

Additionally or alternatively, for example, step (b), at least some of the second propulsion units are pivoted to provide a horizontal thrust component for propulsion.

Additionally or alternatively, for example, in step (c) the aerodynamic control surfaces exclusively provide stability and control to the air vehicle.

Additionally or alternatively, for example, in step (c) the first set of first propulsion units are not operational.

According to a third aspect of the presently disclosed subject matter there is provided method for operating an air vehicle, the air vehicle being as defined according to the aforesaid first aspect of the presently disclosed subject matter, the method comprising operating the air vehicle for VTOL landing.

For example, the method comprises the following steps:
(d) deceleration step, including:
operating the propulsion system to reduce the forward speed of the air vehicle to zero;
operating the second set of second propulsion units to concurrently transition the air vehicle from powered aerodynamic flight mode to vectored thrust flight mode;
(e) descent step, including operating the first set of first propulsion units to provide a vertical thrust with respect to a gross landing weight of the air vehicle to enable the vehicle to descend to a landing point at a predetermined landing rate.

For example, step (e) comprises operating the first set of first propulsion units to provide a nominal maximum thrust, less than the gross landing weight of the air vehicle sufficiently to enable the air vehicle to attain said predetermined landing rate.

Additionally or alternatively, for example, step (d) comprises:
transferring the stability and control of the air vehicle from the aerodynamic control surfaces of the air vehicle to the second propulsion units, and
transferring the lift functions from the wings of the air vehicle to the first propulsion units and optionally the propulsion units.

According to a fourth aspect of the presently disclosed subject matter there is provided method for operating an air vehicle, the air vehicle being as defined according to the aforesaid first aspect of the presently disclosed subject matter, the method comprising operating the air vehicle for STOL take off.

For example, the method comprises the following steps:
(a) climb step, including:
operating the propulsion system to provide horizontal thrust to cause the air vehicle to have a forward speed on the ground;
operating the first set of first propulsion units to supplement lift provided by the wings;
(b) transition step, including operating the second set of second propulsion units to continue providing an increasing forward speed to the air vehicle and concurrently transition the air vehicle from vectored stability and control to aerodynamic stability and control;
(c) aerodynamic flight step, including:
operating the second set of second propulsion units to exclusively provide propulsion for powered aerodynamic flight mode.

For example, step (a) comprises first operating the second set of second propulsion units to provide horizontal thrust until the air vehicle reaches the take-off point, and pivoting the aft second propulsion units to the respective vertical positions to provide control moments at least in pitch.

Additionally or alternatively, for example, step (b) comprises:
fully transferring the stability and control of the air vehicle from the second propulsion units to aerodynamic control surfaces of the air vehicle, and
transferring the lift function from the first propulsion units to the wings of the air vehicle.

Additionally or alternatively, for example, in step (c) the aerodynamic control surfaces exclusively provide stability and control to the air vehicle, and, wherein in step (c) the first set of first propulsion units are not operational.

According to a fifth aspect of the presently disclosed subject matter there is provided a method for operating an air vehicle, the air vehicle being as defined according to the aforesaid first aspect of the presently disclosed subject matter, the method comprising operating the air vehicle for STOL landing.
(d) deceleration step, including:
operating the propulsion system to reduce the forward speed of the air vehicle;
operating the second set of second propulsion units to concurrently begin transition from aerodynamic stability and control to vectored stability and control;
(e) descent and landing step, including operating the first set of first propulsion units to provide a vertical thrust with respect to a gross landing weight of the air vehicle to supplement the reducing lift generated by the wings.

For example, the method further comprises operating the second propulsion units to provide thrust reversal on touchdown.

According to another aspect of the presently disclosed subject matter there is provided an air vehicle has an airframe, aerodynamic lift-generating wings, and a propulsion system. The propulsion system provides propulsion to the air vehicle in powered aerodynamic flight mode and in vectored flight mode, and stability and control in vectored flight mode. The propulsion system includes a first set of non-pivotable first propulsion units, arranged in polygonal arrangement with respect to the airframe, enclosing the air vehicle center of gravity, providing a fixed vertical thrust vector and an aggregate vertical thrust sufficient for enabling vectored flight mode. The propulsion system includes a second set of pivotable second propulsion units, arranged in spaced relationship with respect to the center of gravity, and provide vectored control moments to the air vehicle in three rotational degrees of freedom. The second propulsion units enable angular displacement of the respective thrust vectors at least between a respective vertical position and a respective horizontal position, and provide at least an aggregate horizontal thrust sufficient for providing powered aerodynamic flight mode.

A feature of at least one example of the present disclosed subject matter is that the first propulsion units are optimized for thrust generation only, and not for providing stability and control. In such a case, the first propulsion units have relatively large rotor diameter, and do not require to provide fast response to requirements for changes in thrust, nor variable pitch.

Another feature of at least one example of the present disclosed subject matter is that the second propulsion units are optimized for providing stability and control in vectored thrust flight mode, as well as thrust generation at least for powered aerodynamic flight mode. In such a case, the second propulsion units have relatively smaller rotor diameter than the first propulsion units, and provide fast response to requirements for changes in thrust, for example via variable pitch propellers and/or variable rpm.

Another feature of at least one example of the present disclosed subject matter is that the second propulsion units each have a relative large moment arm with respect to the center of gravity to provide for one or more of roll, pitch and yaw moments.

Another feature of at least one example of the present disclosed subject matter is that via the connection of the booms to the stabilizers, a robust airframe configuration is provided.

Another feature of at least one example of the present disclosed subject matter is that the booms house only non-pivotable propulsion units.

Another feature of at least one example of the present disclosed subject matter is that there is provided multiple redundancies in terms of thrust and stability and control. For example, if one of the front second propulsion units fails, the resulting unwanted large yaw moment can be countered at least partially by the aft second propulsion units in horizontal position. For example, if one or more of the first propulsion units fail, the second propulsion units can supplement thrust in vectored thrust flight modes, to at least bring the air vehicle down safely. For example, if one or more of the second propulsion units fail in stability and control during vectored thrust flight mode, the remaining second propulsion units can be operated to compensate, and/or the first propulsion units can be individually controlled to provide some stability and control. For example, if one or more of the second propulsion units fail in providing propulsion during aerodynamic flight thrust flight mode, the remaining second propulsion units can be operated to compensate.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Referring to FIGS. 1 to 5, an air vehicle according to a first example of the presently disclosed subject matter, generally designated 10, comprises an airframe 100 and a propulsion system 500.

Figure 1:
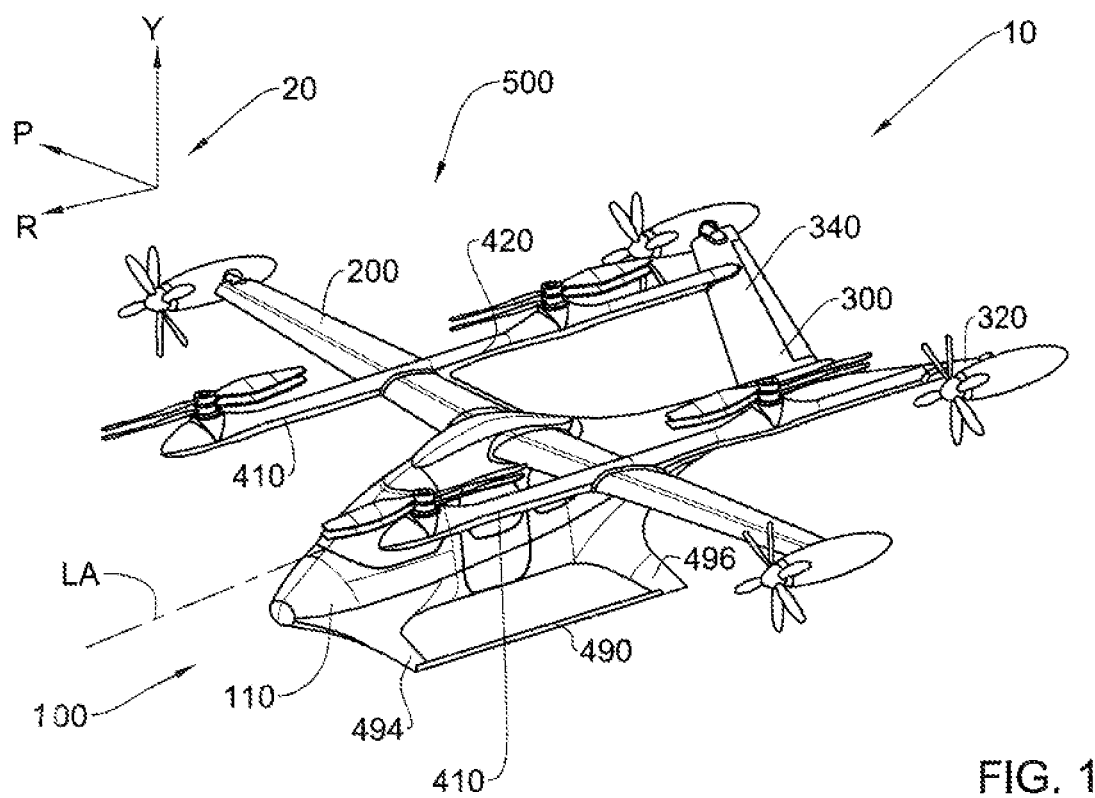
FIG. 1 is a front/top/side isometric view of an example of the air vehicle of the invention in powered aerodynamic flight mode.
Figure 2:
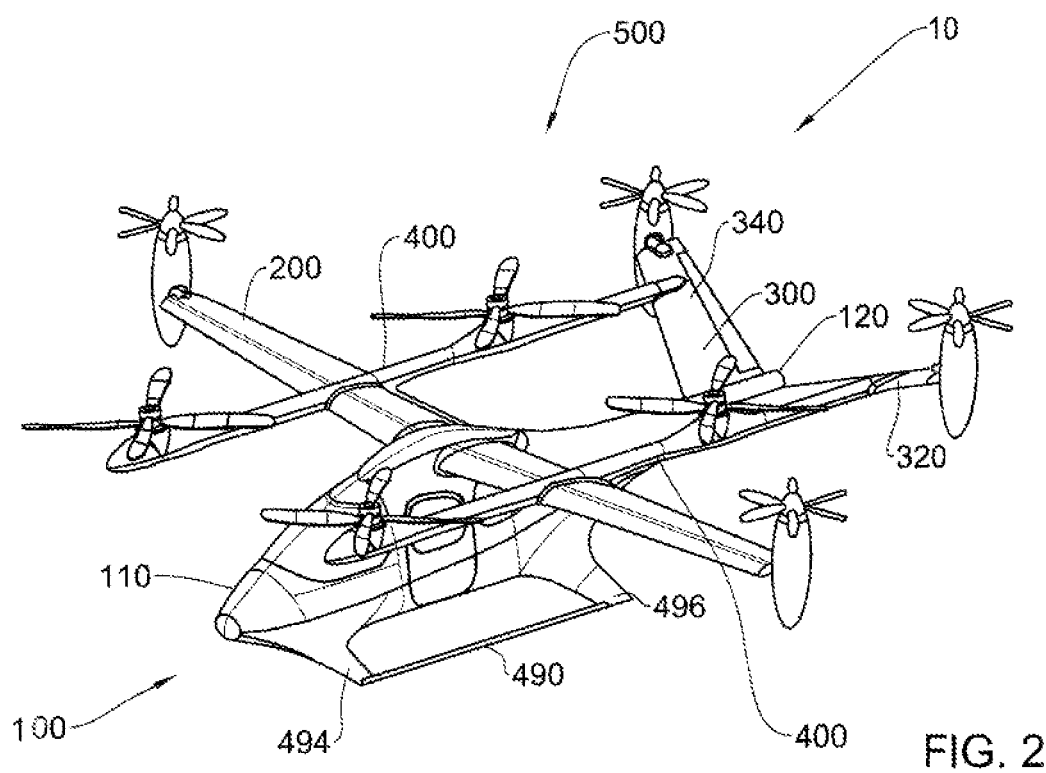
FIG. 2 is a front/top/side isometric view of the example of FIG. 1, in vectored thrust flight mode.

Referring in particular to FIG. 1, for ease of comprehension a Cartesian coordinate system 20 can be defined with respect to the air vehicle 10, in which a roll axis R is defined aligned with the longitudinal axis LA of the air vehicle 10, a lateral pitch axis P is orthogonal to the roll axis R, and a yaw axis Y is orthogonal to the roll axis R and the pitch axis P. The yaw axis Y is nominally vertical when the air vehicle 10 is in straight and level flight.

The air vehicle 10 is configured as any one of a VTOL, VSTOL, or STOL aircraft.

As will become clearer herein, the air vehicle 10 is configured for operating in vectored thrust propulsion mode and in aerodynamic flight propulsion mode. The air vehicle 10 is also configured for operating in transition mode, when transitioning between vectored thrust propulsion mode and aerodynamic flight propulsion mode.

In vectored thrust propulsion mode the propulsion system 500 provides vertical thrust to the air vehicle 10, as well as stability and control, and allows the air vehicle to attain vectored powered flight without requiring any contribution of aerodynamic lift provided by the airframe.

In aerodynamic flight propulsion mode the propulsion system 500 provides horizontal thrust (also referred to herein interchangeably as forward thrust) to the air vehicle 10, and allows the air vehicle 10 to attain aerodynamic powered flight without requiring any contribution of vertical thrust provided by the propulsion system 500.

In transition mode the propulsion system 500 provides thrust to the air vehicle 10, as well as stability and control, and allows the air vehicle to transition between vectored thrust propulsion mode and aerodynamic flight propulsion mode.

In at least this example, the airframe 100 comprises a fuselage 110, wings 200 and empennage 300. In at least this example, the wings 200 are configured for providing sufficient aerodynamic lift in aerodynamic powered flight mode.

The wings 200 are in fixed relationship with respect to the fuselage 110, and thus the air vehicle 10 can be considered a fixed wing aircraft.

In at least this example, the main lift wings 200 are forward and the empennage 300 is aft in conventional arrangement. In this example the aft empennage 300 is in the form of V-tail configuration, including port stabilizer 320 and starboard stabilizer 340 connected to the tail 120 of the fuselage 110 at the apex of the "V". The port stabilizer 320 and starboard stabilizer 340 each include a control surface in the form of a respective pivotable ruddervator 330 for providing control moments to the air vehicle 10, particularly in pitch and/or yaw.

In alternative variations of this example and in other examples, the empennage can have a different form, for example conventional tail including vertical and horizontal stabilizers (including for example rudder and elevators), T-tail, X-tail, H-tail, cruciform "+" tail, and so on.

In yet other alternative variations of this example and in other examples, the air vehicle can have any other suitable configuration, for example tailless configuration, blended body-wing configuration, canard configuration, and so on.

Figure 3:
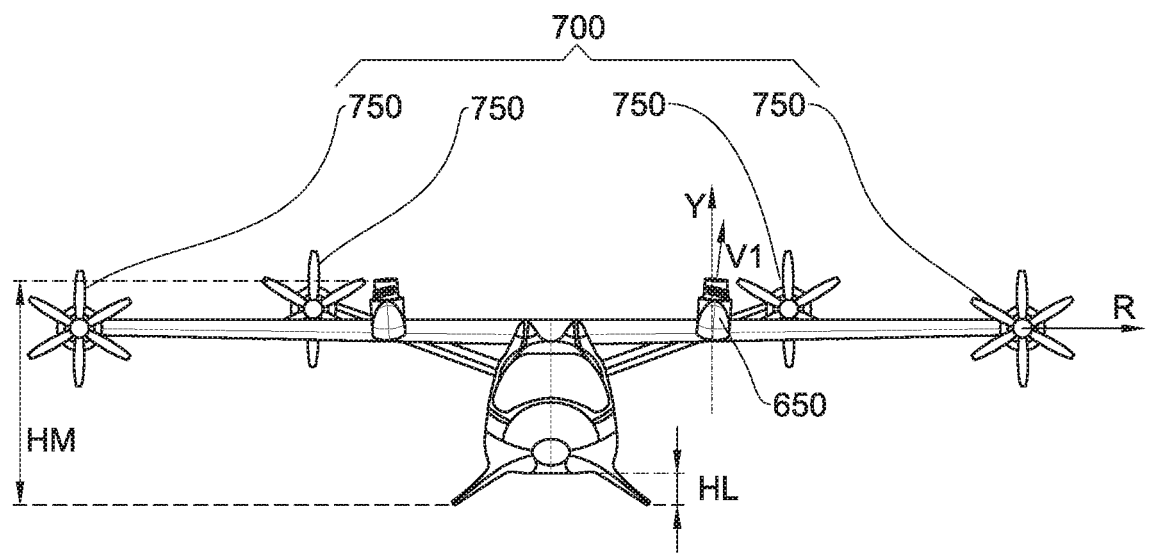
FIG. 3 is a front view of the example of FIG. 1 in powered aerodynamic flight mode.

The air vehicle 10 in at least this example also comprises a suitable undercarriage, in at least this example in the form of a pair of skids 490, each having a touch-down bar for abutting onto a touch-down surface, and forward and aft struts 494, 496 for connecting the respective touch-down bar to an underside of the fuselage 110. Referring to FIG. 3, the skids 490 provide a spacing HL between the underside of the fuselage 110 and the ground when landed. In alternative variations of this example, and in other examples, the undercarriage can include a wheeled undercarriage, either fixed or retractable, or can include utility pontoons for aquatic landing and takeoff.

In at least this example, the air vehicle 10 is configured as a manned air vehicle. For example, and referring in particular to FIGS. 5 and 6, the fuselage 110 includes a combined passenger cabin and cockpit 130, and optionally also a cargo bay (not shown) for example in the form of a baggage compartment. A door 105 provides access to the passenger cabin and cockpit, and optionally also to the cargo bay.

Figure 4:
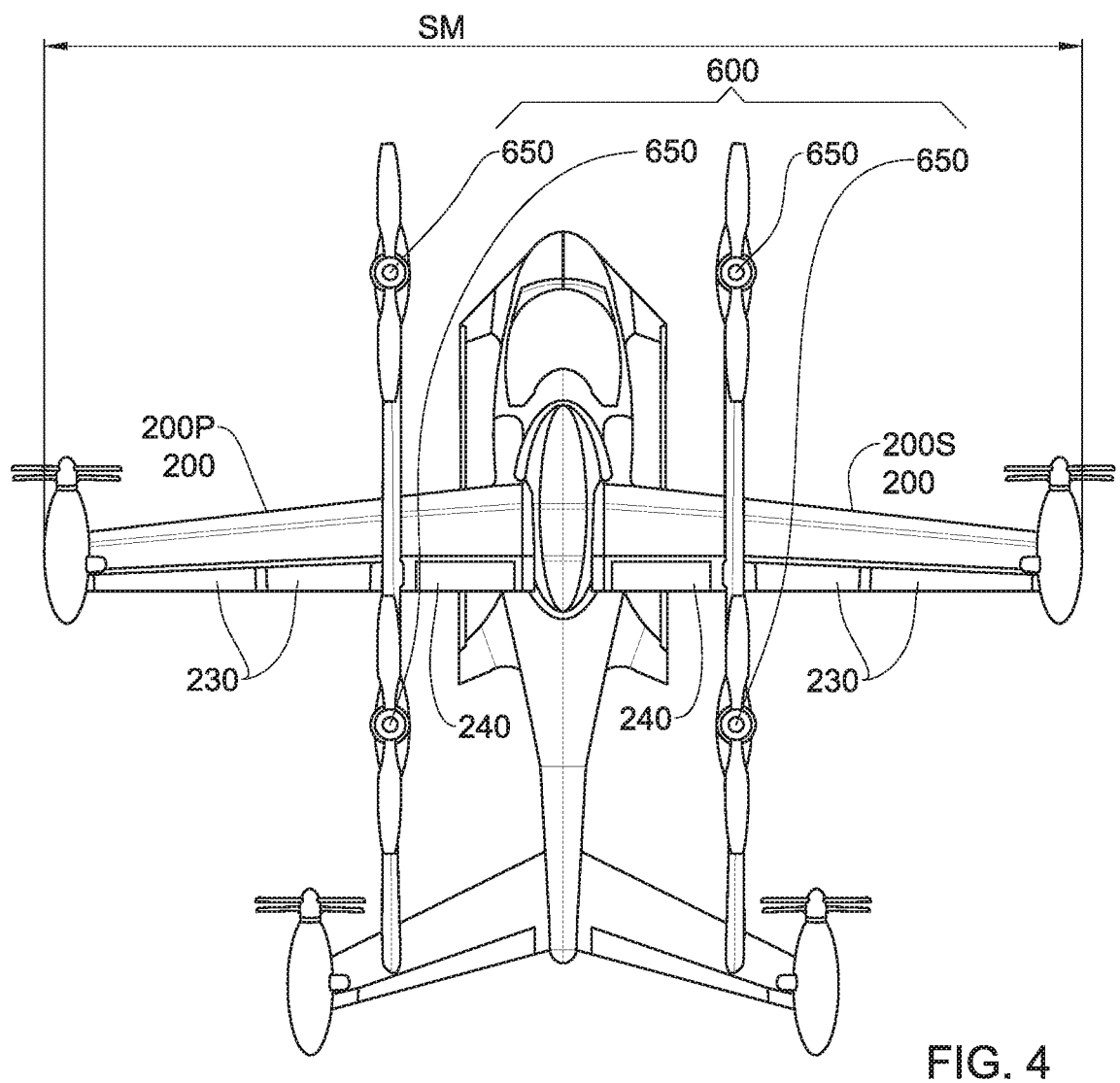
FIG. 4 is a top view of the example of FIG. 1 in powered aerodynamic flight mode.

In at least this example the main lift wings 200 include a port wing 200P and starboard wing 200S, and are configured as zero-swept subsonic wings of relatively high aspect ratio, for example aspect ratio of about 11. Furthermore, in at least this example the main lift wings 200 have aerofoil sections of relatively high camber to enable lift to be generated even at low forward speed and/or at low or even a limited range of negative angle of attack. Referring in particular to FIG. 4, the wings 200 each include control surfaces, in this example in the form of a respective pivotable ailerons 230 and flaps 240, for providing control moments to the air vehicle 10, particularly in pitch and/or roll. By way of non-limiting example, such aerofoil sections can be based on the aerofoil sections disclosed in U.S. Pat. No. 8,109,473 or U.S. Pat. No. 7,992,827 assigned to the present assignee, for example the mild stall high lift aerofoil sections, and the contents of which are incorporated herein.

In alternative variations of this example, and in other examples, the main lift wings can be configured as forward-swept wings or as aft-swept wings, and/or can have different aspect ratios to the above, and/or can have zero camber.

In at least this example, port and starboard booms 400 are provided on the port wing 200P and starboard wing 200S, respectively, of the main lift wings 200. Each boom 400 comprises a forward projecting portion 410 that projects forward of the leading edge of the respective wing 200, and an aft projecting portion 420 that projects aft of the trailing edge of the respective wing 200. Each aft projecting portion 420 is also fixed at an aft end thereof to the respective port stabilizer 320 or starboard stabilizer 340.

Figure 5:
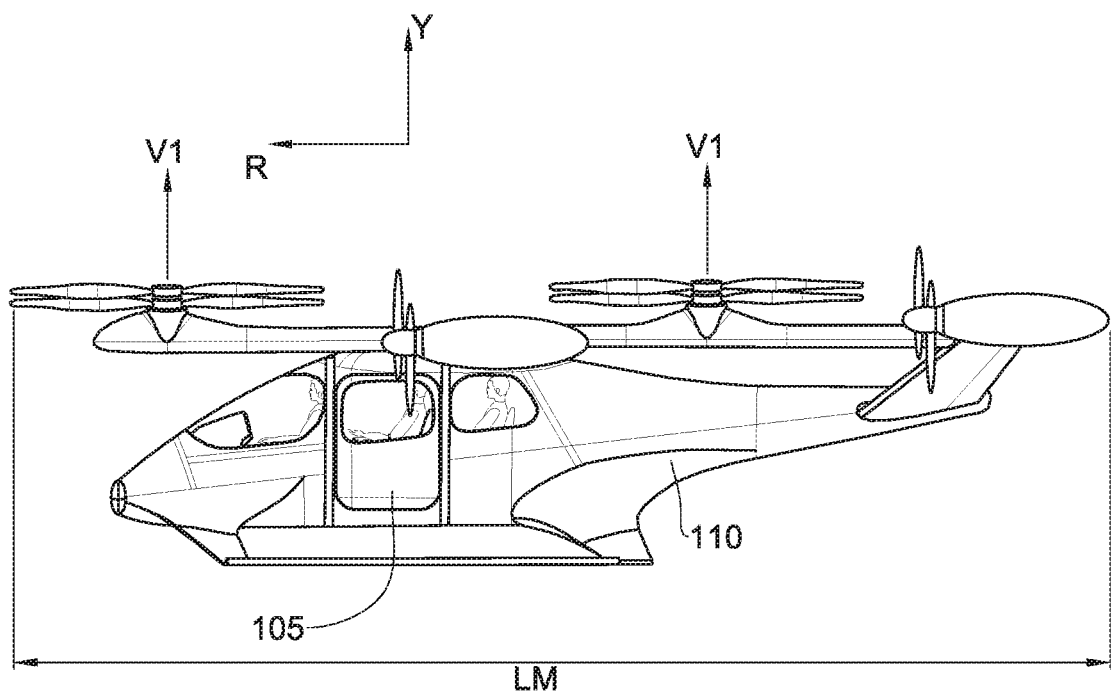
FIG. 5 is a side view of the example of FIG. 1 in powered aerodynamic flight mode.
Figure 6:
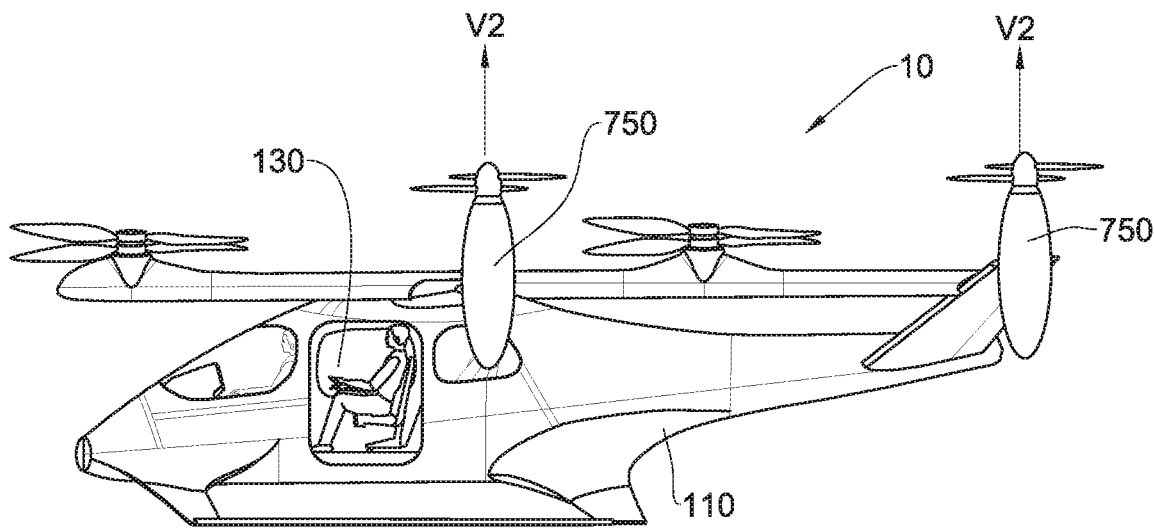
FIG. 6 is a side view of the example of FIG. 1 in vectored thrust flight mode.

Referring in particular to FIGS. 3, 4, 5, the air vehicle 10 has a maximum axial length LM, width SM and height HM.

Referring in particular to FIGS. 3 and 4, the propulsion system 500 is configured for providing propulsion, stability and control functions to the air vehicle 10, and comprises a first set 600 of first propulsion units 650, and a second set 700 of second propulsion units 750. The first set 600 of first propulsion units 650 is different from the second set 700 of second propulsion units 750, and each one of the first set 600 and second set 700 is configured for performing a different function of the various propulsion, stability and control functions.

The propulsion, stability and control functions include:

VT function~vertical propulsion for vectored thrust propulsion mode including vectored thrust take-off, landing, and hovering;

HT function~horizontal propulsion for powered aerodynamic flight mode;

TMT function~propulsion during transition mode, between vectored thrust propulsion mode and aerodynamic flight propulsion mode;

VC function~stability and control in vectored thrust propulsion mode;

HC function~stability and control in aerodynamic flight propulsion mode;

TMC function~stability and control during transition between vectored thrust propulsion mode and aerodynamic flight propulsion mode.

According to an aspect of the presently disclosed subject matter, the first set 600 of first propulsion units 650 exclusively provides the VT function, although optionally the second set 700 of second propulsion units 750 can supplement the first set 600 of first propulsion units 650 in providing the VT function, for example in emergency scenarios such as for example in the event of malfunction or other loss of thrust in one or more of the first propulsion units 650. In other examples, the first set 600 of first propulsion units 650 exclusively provides the VT function in terms of balancing the gross take-off weight of the air vehicle 10, and optionally the second set 700 of second propulsion units 750 supplement the first set 600 of first propulsion units 650 in providing additional thrust for vertical climb and acceleration of the VT function.

According to this aspect of the presently disclosed subject matter, the second set 700 of second propulsion units 750 exclusively provides HT function and VC function. In other words, the first set of first propulsion units 650 is not configured for and does not provide any control and stability functions, i.e., the VC, HC or TMC functions during normal operations of the air vehicle 10. Optionally the first set 600 of first propulsion units 650 can be configured for supplementing the second set 700 of second propulsion units 750 in providing at least part of the VC or TMC functions, for example in emergency scenarios such as for example in the event of malfunction or other loss of thrust in one or more of the second propulsion units 750.

The TMT function is provided concurrently by both the first set 600 of first propulsion units 650 and the second set 700 of second propulsion units 750, via different relative proportions that vary during the transition between vectored thrust propulsion mode and aerodynamic flight propulsion mode, as will become clearer herein. For example at the start of transition from vectored thrust propulsion mode and aerodynamic flight propulsion mode, the TMT function is provided 100% by the first set 600 of first propulsion units 650, and as transition progresses the first set 600 of first propulsion units 650 provides less and less thrust while concurrently the second set 700 of second propulsion units 750 provide forward thrust and speed to the air vehicle 10, such that by the time the transition in over the first set 600 of first propulsion units 650 provide zero vertical thrust, while the second set 700 of second propulsion units 750 provide all the required thrust for aerodynamic powered flight. The converse is provided for transition from horizontal mode to vertical mode.

The HC function is generally provided via the control surfaces of the wings 200 and/or stabilizers 320, 340, in particular the ailerons 230, flaps 240 and/or ruddervators 330. Nevertheless, the second set 700 of second propulsion units 750 can optionally and selectively also provide control moments for the HC function.

The TMC function is provided concurrently by both the second set 700 of second propulsion units 750, and the control surfaces of the wings 200 and/or of the stabilizers 320, 340, via different relative amounts that vary during the transition between vectored thrust propulsion mode and aerodynamic flight propulsion mode, as will become clearer herein. For example at the start of transition from vectored thrust propulsion mode and aerodynamic flight propulsion mode, the TMC function is provided 100% by the second set 700 of second propulsion units 750, and as transition progresses the second set 700 of second propulsion units 750 provides progressively less control moments while concurrently the control surfaces of the wings 200 and/or stabilizers 320, 340 provide progressively more of the required control moments as the forward speed to the air vehicle 10 increases, such that by the time the transition is over the second set 700 of second propulsion units 750 provide zero control moments, while the control surfaces of the wings 200 and/or stabilizers 320, 340 provide all the required control moments for aerodynamic powered flight. The converse is provided for transition from horizontal mode to vertical mode.

Optionally, the second set 700 of second propulsion units 750 can be operated to contribute to the control moments concurrently with the control surfaces of the wings 200 and/or stabilizers 320, 340 during HC functions in aerodynamic flight mode.

Figure 7:
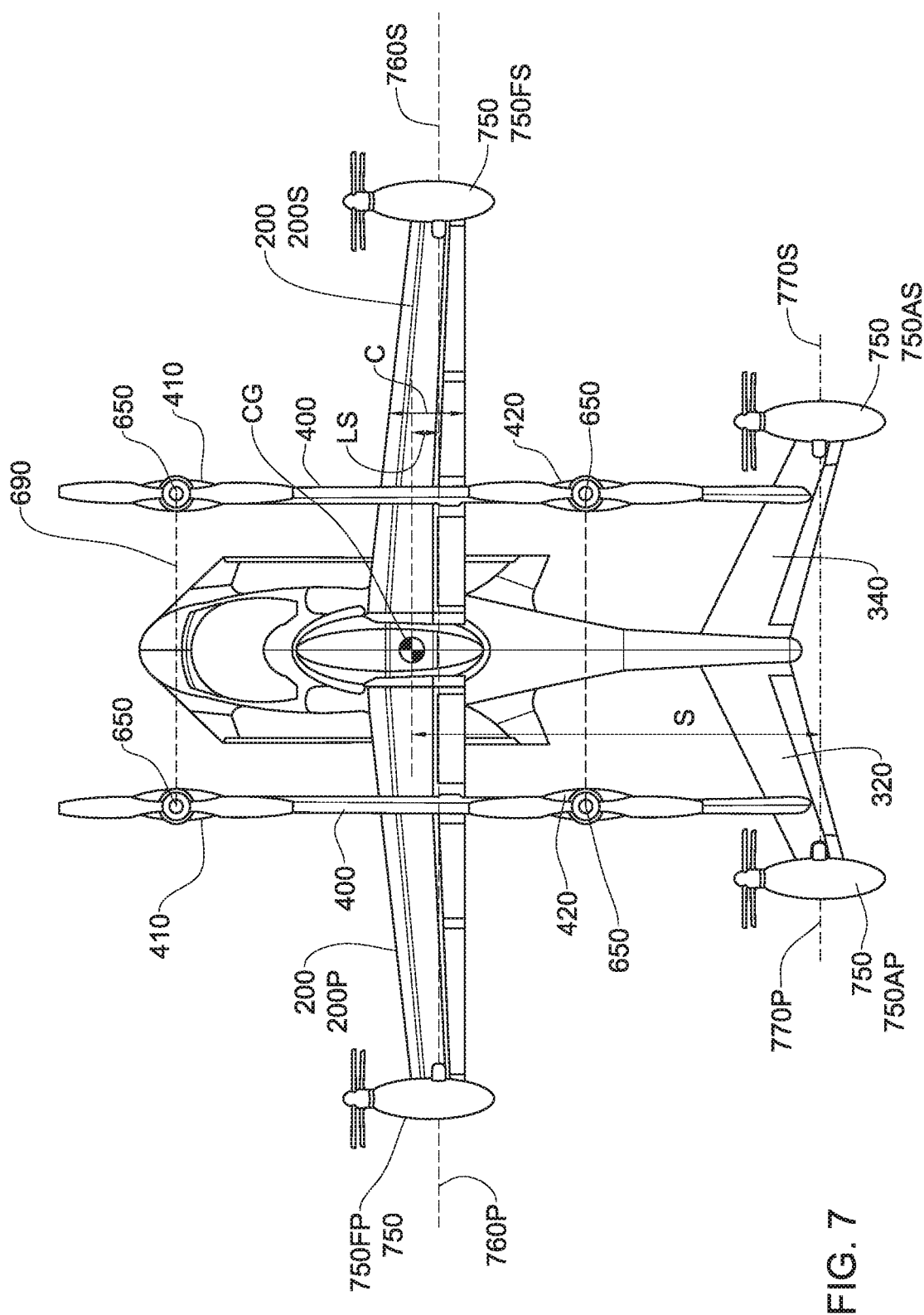
FIG. 7 is another top view of the example of FIG. 1 in powered aerodynamic flight mode.
Figure 8:
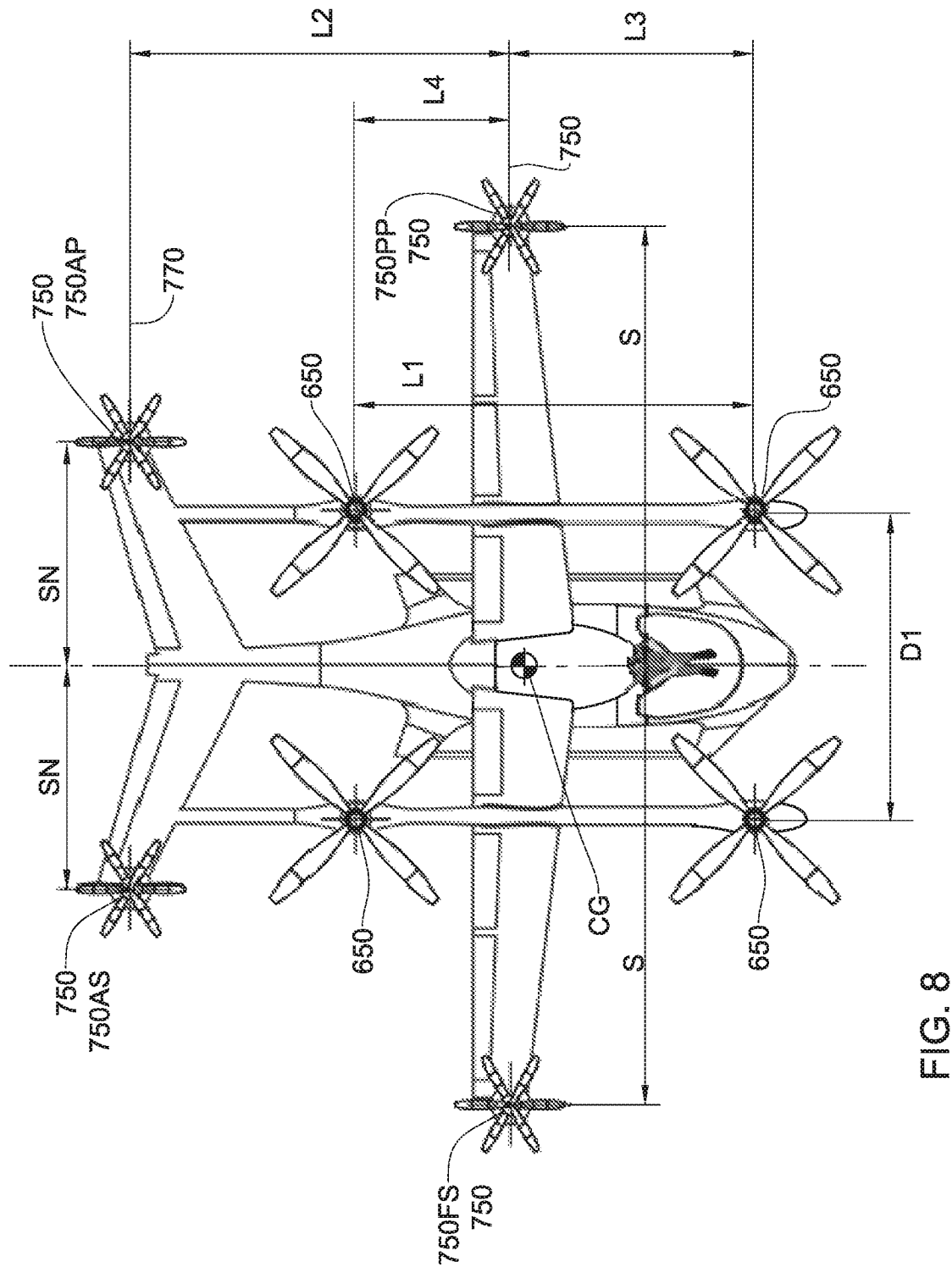
FIG. 8 is a top view of the example of FIG. 1 in vectored thrust flight mode.

In at least this example the first set of first propulsion units 600 comprises four first propulsion units 650. The four first propulsion units 650 are arranged in polygonal arrangement 690, in this example in rectangular arrangement, with respect to the airframe 100. As best seen in FIGS. 7 and 8, this polygonal or rectangular arrangement encloses the center of gravity CG of the air vehicle 10 when the air vehicle 10 is viewed in plan view. In this rectangular arrangement, and referring in particular to FIG. 8, the two front first propulsion units 650 are longitudinally spaced from the two aft first propulsion units 650 by a longitudinal spacing L1, and the two starboard first propulsion units 650 are laterally spaced from the two port first propulsion units 650 by a lateral spacing D1.

In at least this example the first propulsion units 650 are non-pivotable propulsion units, so that each first propulsion unit 650 provides a fixed generally vertical thrust vector V1 with respect to the airframe 100.

In other words, in at least this example the first propulsion units 650 are fixedly attached with respect to the airframe 100, so that each first propulsion unit 650 provides a fixed generally vertical thrust vector V1 with respect to the airframe 100.

The vertical thrust vector V1 is parallel to the yaw axis Y when viewed in side view (FIG. 5). The vertical thrust vector V1 can also be orthogonal to the roll axis R, or set at an anhedral angle to the roll axis R, or (as illustrated in FIG. 3) set at a dihedral angle to the roll axis R at a when viewed in front view.

Referring in particular to FIG. 7, the first propulsion units 650 are fixedly mounted to the booms 400, i.e. the spatial orientation of the thrust vectors of the first propulsion units 650 with respect to the airframe, for example with respect to the booms 400, is geometrically fixed.

The front port first propulsion unit 650 is fixedly mounted to the port forward projecting portion 410 of the port boom 400.

The front starboard first propulsion unit 650 is fixedly mounted to the starboard forward projecting portion 410 of the starboard boom 400.

The aft port first propulsion unit 650 is fixedly mounted to the port aft projecting portion 420 of the port boom 400.

The aft starboard first propulsion unit 650 is fixedly mounted to the starboard aft projecting portion 420 of the starboard boom 400.

In at least this example, the four first propulsion units 650 each provide the same level of thrust V1 one to the other, and are equidistant from the center of gravity CG in plan view. Thus the center of thrust provided by the aggregate vertical thrust VT provided by all first propulsion units 650 is aligned with the center of gravity CG.

In alternative variations of this example, the center of thrust provided by the aggregate vertical thrust VT provided by all first propulsion units 650 can be longitudinally spaced from the center of gravity CG. In such cases, the two aft first propulsion units 650 can be configured to provide more thrust, or less thrust, than the two forward first propulsion units 650, according to whether the center of thrust is forward or aft, respectively, of the center of gravity CG, to balance the air vehicle 10.

It is to be noted that since the first set 600 of first propulsion units 650 are not configured for and do not provide any control and stability functions, the first propulsion units 650 are designed only for thrust generation. As such the first set 600 of first propulsion units 650 are rated to provide an aggregate vertical thrust VT that is at least equal to and preferably exceeds the gross all-up-weight of the air vehicle 10 including pilot, passengers and other payload. In particular, the first set 600 of first propulsion units 650 can be rated to provide an aggregate vertical thrust VT that exceeds the gross all-up-weight of the air vehicle 10 by a factor N of the gross all-up-weight, wherein N can be for example in the range of 20% to 80%, more preferably in the range 30% to 70%, more preferably in the range 40% to 60%, more preferably in the range 45% to 55%, or about 50%. Such a factor N allows for hovering capability for the air vehicle 10 without the need for the second set 700 of second propulsion units 750 to provide any supplementary vertical thrust.

In at least this example, each first propulsion unit 650 includes two electric motors, each coupled to a respective propeller, and configured to turn the respective propellers in mutually co-rotational directions in order to simplify construction of the first propulsion units 650 and/or minimize noise generation.

In alternative variations of this example, each first propulsion unit 650 can include one or a plurality of electric motors coupled to one or more propellers or other rotors, and/or in which such a plurality of propellers/rotors can be co-rotating or counter rotating. Additionally or alternatively, in such examples some of the respective first propulsion units can include propellers/rotors that turn clockwise and other of the respective first propulsion units can include propellers/rotors that turn counterclockwise—for example the forward starboard and aft port first propulsion units 650 can have clockwise rotating propellers/rotors, while the forward port and aft starboard first propulsion units 650 can have counter-clockwise rotating propellers/rotors; or vice versa.

In at least this example, each of the two propellers of each first propulsion unit 650 includes two sets of two blades, and thus each one of the corresponding two electric motors is coupled to and drives a two-bladed propeller. Furthermore each one of the first propulsion units 650 is configured for feathering the propellers such that the respective blades are parallel with the longitudinal axis LA when the first set 600 of first propulsion units 650 are not active and thus not generating thrust, and particularly when the air vehicle 10 is in aerodynamic flight mode, in order to minimize drag contribution of the propellers.

In at least this example, each first propulsion unit 650 is configured with the blades being fixed pitch, and optionally including gear reduction.

Since in at least this example the first propulsion units 650 are electrically powered, they can each be controlled separately to provide the same thrust or different thrusts one from the other.

Referring to FIGS. 7 and 8, in at least this example, the second propulsion units 750 are each pivotably mounted to the airframe 100, i.e. the spatial orientation of the thrust vectors of the second propulsion units 750 with respect to the airframe, is not geometrically fixed, and the spatial orientation of the thrust vectors can be selectively changed, as will become clearer herein.

The front port second propulsion unit 750 (also referred to with reference numeral 750FP) is pivotably mounted to the wing tip of the port forward wing 200P about the respective pivot axis 760P. Thus, the front port second propulsion unit 750FP is spaced from the center of gravity CG and roll axis R (in a lateral direction, or in plan view) by the span S of the respective wing.

The front starboard second propulsion unit 750 (also referred to with reference numeral 750FS) is pivotably mounted to the wing tip of the starboard forward wing 200S about the respective pivot axis 760S. Thus, the front starboard second propulsion unit 750FS is spaced from the center of gravity CG and roll axis R (in a lateral direction, or in plan view) by the span S of the respective wing.

The aft port second propulsion unit 750 (also referred to with reference numeral 750AP) is pivotably mounted to the wing tip of the port stabilizer 320 about the respective pivot axis 770P. Thus, the aft port second propulsion unit 750AP is spaced from the center of gravity CG and roll axis R (in a lateral direction, or in plan view) by a spacing SN.

The aft starboard second propulsion unit 750 (also referred to with reference numeral 750AS) is pivotably mounted to the wing tip of the starboard stabilizer 340 about the respective pivot axis 770S. Thus, the aft starboard second propulsion unit 750AS is spaced from the center of gravity CG and roll axis R (in a lateral direction, or in plan view) by a spacing SN.

Pivot axis 760S and pivot axis 760P are coaxial, and are parallel to the pitch axis P. Furthermore, in at least this example, the co-aligned pivot axis 760S and pivot axis 760P pass through the center of gravity CG (in plan view), or are close thereto when seen in plan view (FIG. 7). For example, and referring to FIG. 7, the longitudinal spacing LS between the co-aligned pivot axes 760S, 760P and the center of gravity CG is less than the average chord C of the wings 200. For example, the ratio LS/C can be in any one of the following ranges: 0 to +1; +0.1 to +0.9; +0.2 to +0.8; +0.3 to +0.7; +0.4 to +0.6; +0.45 to +0.55. Alternatively, for example, the ratio LS/C can be in any one of the following ranges: 0 to −1; −0.1 to −0.9; −0.2 to −0.8; −0.3 to −0.7; −0.4 to −0.6; −0.45 to −0.55. A positive (+) value for the ratio LS/C places the center of gravity CG forward of the co-aligned pivot axes 760S, 760P, while a negative value (−) for the ratio LS/C places the center of gravity CG aft of the co-aligned pivot axes 760S, 760P.

Pivot axis 770S and pivot axis 770P are coaxial, and are parallel to the pitch axis P. Furthermore, in at least this example, the co-aligned pivot axis 770S and pivot axis 770P are spaced aft from the center of gravity CG (in plan view) by a spacing S (FIG. 7). For example, and referring to FIG. 7, the longitudinal spacing S between the co-aligned pivot axes 770S, 770P and the center of gravity CG is greater than the average chord C of the wings 200. For example, the ratio S/C can be in any one of the following ranges: 1 to 10; 2 to 9; 3 to 8, 4 to 7, 5 to 6; or greater than 10.

In this example, and referring to FIG. 8, the pivot axes 770P, 770S are longitudinally spaced from the pivot axes 760P, 760S by longitudinal spacing L2, the pivot axes 760P, 760S are longitudinally spaced from the two front first propulsion units 650 by longitudinal spacing L3, and the pivot axes 760P, 760S are longitudinally spaced from the two aft first propulsion units 650 by longitudinal spacing L4.

The second propulsion units 750 are each configured to be pivotably rotated about the respective pivot axis about a pivot angle θ at least between a vertical position (θ=90°) and a horizontal position (θ=0°). In the vertical position, the respective thrust vector V2 of the respective second propulsion units 750 is nominally parallel to the yaw axis Y, while in the horizontal position, the respective thrust vector V2 of the respective second propulsion units 750 is nominally parallel to the roll axis R. The angular displacement for the pivot angle θ in such a case is from 0° to 90°.

In at least this example, the pair of front port and starboard second propulsion units 750FP, 750FS, are optionally further configured for providing an angular displacement in excess of 90°, for example between −30° and 120°. For example, the pair of front port and starboard second propulsion units 750FP, 750FS, can be pivoted past the vertical position to a pivot angle greater than 90°, for example 1200 such that a component of the respective second thrust vector V2 is pointing aft, thereby enabling the respective second propulsion units 750 to provide a corresponding reverse thrust component. Further optionally, the pair of front port and starboard second propulsion units 750FP, 750FS, can be pivoted in the opposite direction towards and past the horizontal position to a pivot angle less than 0°, for example −30° such that a component of the respective second thrust vector V2 is pointing downwards and optionally also forward or aft, thereby enabling the respective second propulsion units 750 to provide a corresponding downward thrust component.

Alternatively, reverse thrust can be provided by controlling the pitch of the propellers 755 of the propeller/rotors of the respective front port and starboard second propulsion units 750FP, 750FS, for example by pitching the respective propeller blades of front port and starboard second propulsion units 750FP, 750FS in the opposite pitch direction as before.

Additionally or alternatively, the pair of aft port and starboard second propulsion units 750AP, 750AS, are optionally further configured for providing an angular displacement θ in excess of 90°, for example between −30° and 120°. For example, the pair of aft port and starboard second propulsion units 750AP, 750AS, can be pivoted past the vertical position to a pivot angle greater than 90°, for example 1200 such that a component of the respective second thrust vector V2 is pointing aft, thereby enabling the respective second propulsion units 750 to provide a corresponding reverse thrust component. Further optionally, the pair of aft port and starboard second propulsion units 750AP, 750AS, can be pivoted in the opposite direction towards and past the horizontal position to a pivot angle less than 0°, for example −30° such that a component of the respective second thrust vector V2 is pointing downwards and optionally also forward or aft, thereby enabling the respective second propulsion units 750 to provide a corresponding downward thrust component.

Alternatively, reverse thrust can be provided by reversing the rotational direction of the propeller/rotors of the respective aft port and starboard second propulsion units 750AP, 750AS, for example by turning the respective electric engines of aft port and starboard second propulsion units 750AP, 750AS in the opposite direction as before.

In at least this example, the pair of front port and starboard second propulsion units 750FP, 750FS, are configured for being selectively pivoted together in the same direction and at the same rate and over the same angular displacement. Thus, in such operation the two respective thrust vectors V2 are continuously parallel with one another and facing along the same direction one to the other.

Furthermore, in at least this example, the pair of front port and starboard second propulsion units 750FP, 750FS, are further configured for being selectively pivoted together in mutually opposite directions, but at the same rate and over the same angular displacement (in mutually opposite directions). Thus, in such operation the two respective thrust vectors V2 are facing along different directions one to the other. For example, the two respective thrust vectors V2 can be facing mutually opposite directions one to the other, for example one such thrust vector V2 can be in the vertically upward direction, while the other such thrust vector V2 can be in the vertically downward direction.

Additionally or alternatively, the pair of aft port and starboard second propulsion units 750AP, 750AS, are configured for being selectively pivoted together in the same direction and at the same rate and over the same angular displacement. Thus, in such operation the two respective thrust vectors V2 are continuously parallel with one another and facing along the same direction one to the other.

Furthermore, additionally or alternatively, the pair of aft port and starboard second propulsion units 750AP, 750AS, are further configured for being selectively pivoted together in the opposite directions, but at the same rate and over the same angular displacement (in mutually opposite directions). Thus, in such operation the two respective thrust vectors V2 are facing along different directions one to the other. For example, the two respective thrust vectors V2 can be facing mutually opposite directions one to the other, for example one such thrust vector V2 can be in the vertically upward direction, while the other such thrust vector V2 can be in the vertically downward direction.

In at least this example, each second propulsion unit 750 includes two electric motors, each coupled to a respective propeller 755, and configured to turn the respective propellers 755 in mutually co-rotational directions in order to simplify construction of the second propulsion units 750 and/or minimize noise generation.

In alternative variations of this example, each second propulsion unit 750 can include one or a plurality of electric motors coupled to one or more propellers or other rotors, and/or in which such a plurality of propellers/rotors can be co-rotating or counter rotating.

Additionally or alternatively, in such examples some of the respective second propulsion units can include propellers/rotors that turn clockwise and other of the respective second propulsion units can include propellers/rotors that turn counterclockwise.

In at least this example, each of the two propellers 755 of each second propulsion unit 750 includes two sets of three blades, and thus each one of the corresponding two electric motors is coupled to and drives a three-bladed propeller. It is to be noted that in alternative variations of this example each propeller 755 can include sets of 2 blades, or two sets of any one of 4, 5, 6, blades or more than 6 blades.

In at least this example, each second propulsion unit 750 is configured for providing a corresponding thrust V2 that is selectively variable. For example each second propulsion unit 750 is configured with the blades being of variable pitch, and/or including a suitable gear mechanism. Additionally or alternatively, the rotational speed (rpm) of each second propulsion unit 750 can be individually controlled to control the level of the corresponding thrust V2 generated by the respective second propulsion unit 750.

It is to be noted that the air vehicle 10 includes suitable rechargeable batteries (not shown) for powering the first propulsion units 650 and the second propulsion units 750.

It is to be noted that the second set 700 of second propulsion units 750 are configured for and provide all control and stability functions during vectored thrust mode, as well as thrust generation during aerodynamic flight mode. As such the second set 700 of second propulsion units 750 are rated to provide an aggregate horizontal thrust VT that is sufficient for powering the air vehicle 10 at all parts of the flight envelope relating to aerodynamic flight mode.

For example, the second set 700 of second propulsion units 750 provides control moments in pitch, for the VC function and the TMC function, as follows.

For inducing a negative pitching moment (nose down), the pair of aft port and starboard second propulsion units 750AP, 750AS, can be pivoted towards the vertical position, such that the second thrust V2 generated by these two second propulsion units 750AP, 750AS, has a vertical thrust component in the upward direction. Due to the moment arm provided by spacing S, the vertical thrust component of second thrust V2 provides a nose down negative pitch moment to the air vehicle 10. To induce a positive pitching moment (nose up), the pair of aft port and starboard second propulsion units 750AP, 750AS, can be operated, for example via the variable pitch blades thereof, such that the second thrust V2 generated by these two second propulsion units 750AP, 750AS, has a vertical thrust component in the downward direction. Due to the moment arm provided by spacing S, the downward vertical thrust component of second thrust V2 provides a nose up positive pitch moment to the air vehicle 10.

For inducing a positive yaw moment (nose towards starboard), the pair of forward port and starboard second propulsion units 750FP, 750FS, can be pivoted if necessary towards the horizontal position, such that the second thrust V2 generated by these two second propulsion units 750FP, 750FS, has a horizontal thrust component in the forward direction. Furthermore, the pair of forward port and starboard second propulsion units 750FP, 750FS, are operated such that the horizontal thrust component provided by the port second propulsion units 750FP is greater than the horizontal thrust component provided by the starboard second propulsion units 750FS. Due to the moment arm provided by span SN, the differential in the horizontal thrust components provided by the two front second propulsion units provides a starboard positive yaw moment to the air vehicle 10. To induce a negative yaw moment (nose towards port), the same procedure can be adopted, mutatis mutandis, with the difference that this time the pair of forward port and starboard second propulsion units 750FP, 750FS, are operated such that the horizontal thrust component provided by the starboard second propulsion units 750FS is greater than the horizontal thrust component provided by the port second propulsion units 750FP. In this manner, the forward port and starboard second propulsion units 750FP, 750FS, can be operated to concurrently provide yaw moments in vectored flight mode, i.e., for the VC function and the TMC function, or as back-up in powered aerodynamic flight mode in which the aerodynamic control surfaces normally provide the required yaw moments.

Alternatively, a positive yaw moment (nose towards starboard) can be induced in a different manner. For example, the pair of forward port and starboard second propulsion units 750FP, 750FS, can be pivoted in mutually opposite directions such that the second thrust V2 generated by each of these two second propulsion units 750FP, 750FS, has a horizontal thrust component, but in mutually opposite directions. At the same time the second thrust V2 generated by each of these two second propulsion units 750FP, 750FS, can also have a vertical thrust component for supplementing take-off, landing or hover capability during vectored thrust mode. For example the forward port second propulsion units 750FP is pivoted to about 80°, while the starboard second propulsion unit 750FS is pivoted to about 100°. The pair of forward port and starboard second propulsion units 750FP, 750FS, are operated such that the horizontal thrust component provided by the port second propulsion units 750FP is in the forward direction, while the horizontal thrust component provided by the starboard second propulsion unit 750FS is in the aft direction Due to the moment arm provided by span SN, the couple generated by the horizontal thrust components provided by the two front second propulsion units provides a starboard positive yaw moment to the air vehicle 10. To induce a negative yaw moment (nose towards port), the same procedure can be adopted, mutatis mutandis, with the difference that this time the pair of forward port and starboard second propulsion units 750FP, 750FS, are operated such that the horizontal thrust component provided by the starboard second propulsion units 750FS is in the forward direction while the horizontal thrust component provided by the port second propulsion unit 750FP is in the aft direction. In this manner, the forward port and starboard second propulsion units 750FP, 750FS, can be operated to provide the control moments while the air vehicle is in vectored thrust mode, in either takeoff, landing or hover. It is also to be noted that the forward port and starboard second propulsion units 750FP, 750FS, can be operated in this manner to provide the control moments in yaw in vectored flight mode, i.e., for the VC function and the TMC function, or as back-up in powered aerodynamic flight mode in which the aerodynamic control surfaces normally provide the required yaw moments and with for example the aft port and starboard second propulsion units 750AP, 750AS, providing the necessary thrust for forward flight.

Alternatively, yaw moments for VC function can be provided with the pair of forward port and starboard second propulsion units 750FP, 750FS, in horizontal position, and via the variable pitch mechanisms of the second propulsion units 750FP, 750FS one of the second propulsion units 750FP, 750FS is operated to provide a thrust in a forward direction, while the other one of second propulsion units 750FP, 750FS is operated to provide a thrust in an aft direction.

Additionally or alternatively, for example, for inducing a positive yaw moment (nose towards starboard), the pair of aft port and starboard second propulsion units 750AP, 750AS, can be pivoted if necessary towards the horizontal position, such that the second thrust V2 generated by these two second propulsion units 750AP, 750AS, has a horizontal thrust component in the forward direction. Furthermore, the pair of aft port and starboard second propulsion units 750AP, 750AS, are operated such that the horizontal thrust component provided by the port second propulsion units 750AP is greater than the horizontal thrust component provided by the starboard second propulsion units 750AS. Due to the moment arm provided by spacing SD, the differential in the horizontal thrust components provided by the two aft second propulsion units provides a starboard positive yaw moment to the air vehicle 10. To induce a negative yaw moment (nose towards port), the same procedure can be adopted, mutatis mutandis, with the difference that this time the pair of aft port and starboard second propulsion units 750AP, 750AS, are operated such that the horizontal thrust component provided by the starboard second propulsion unit 750AS is greater than the horizontal thrust component provided by the port second propulsion units 750AP. In this manner, the aft port and starboard second propulsion units 750AP, 750AS, can be operated to concurrently provide yaw moments in vectored flight mode, i.e., for the VC function and the TMC function, or as back-up in powered aerodynamic flight mode in which the aerodynamic control surfaces normally provide the required yaw moments.

Alternatively, a positive yaw moment (nose towards starboard) can be induced in a different manner. For example, the pair of aft port and starboard second propulsion units 750AP, 750AS, can be operated, for example via the variable pitch mechanism of the second propulsion units 750AP, 750AS, such that the second thrust V2 generated by each of these two second propulsion units 750AP, 750AS, has a horizontal thrust component, but in mutually opposite directions. The pair of aft port and starboard second propulsion units 750AP, 750AS, are operated such that the horizontal thrust component provided by the port second propulsion units 750AP is in the forward direction, while the horizontal thrust component provided by the starboard second propulsion unit 750AS is in the aft direction. Due to the moment arm provided by spacing SD, the couple generated by the horizontal thrust components provided by the two aft second propulsion units provides a starboard positive yaw moment to the air vehicle 10. To induce a negative yaw moment (nose towards port), the same procedure can be adopted, mutatis mutandis, with the difference that this time the pair of aft port and starboard second propulsion units 750AP, 750AS, are operated such that the horizontal thrust component provided by the starboard second propulsion units 750AS is in the forward direction while the horizontal thrust component provided by the port second propulsion unit 750AP is in the aft direction. In this manner, the aft port and starboard second propulsion units 750AP, 750AS, can be operated to provide the control moments while the air vehicle is in vectored thrust mode, in either takeoff, landing or hover. It is also to be noted that the aft port and starboard second propulsion units 750AP, 750AS, can be operated in this manner to provide the control moments while the air vehicle is in powered aerodynamic flight mode, with for example the forward port and starboard second propulsion units 750FP, 750FS, providing the necessary thrust for forward flight. For inducing a positive roll moment (port wing is lifted and starboard wing is lowered), the pair of forward port and starboard second propulsion units 750FP, 750FS, can be pivoted if necessary towards the vertical position, such that the second thrust V2 generated by each of these two second propulsion units 750FP, 750FS, has a vertical thrust component in the upward direction. Furthermore, the pair of forward port and starboard second propulsion units 750FP, 750FS, are operated such that the vertical thrust component provided by the port second propulsion units 750FP is greater than the vertical thrust component provided by the starboard second propulsion units 750FS. Due to the moment arm provided by span SN, the thrust differential generated by the vertical thrust components provided by the two front second propulsion units provides a positive roll moment to the air vehicle 10. To induce a negative roll moment (port wing is lowered and starboard wing is lifted), the same procedure can be adopted, mutatis mutandis, with the difference that this time the pair of forward port and starboard second propulsion units 750FP, 750FS, are operated such that the vertical thrust component provided by the starboard second propulsion units 750FS is greater than the vertical thrust component provided by the port second propulsion units 750FP. In this manner, the forward port and starboard second propulsion units 750FP, 750FS, can be operated to provide the control moments while the air vehicle is in vectored thrust mode, in either takeoff, landing or hover. It is also to be noted that the forward port and starboard second propulsion units 750FP, 750FS, can be operated in this manner to provide the control moments while the air vehicle is in powered aerodynamic flight mode, with for example the aft port and starboard second propulsion units 750AP, 750AS, providing the necessary thrust for forward flight.

Alternatively, a positive roll moment can be induced in a different manner. For example, the pair of forward port and starboard second propulsion units 750FP, 750FS, can be can be operated, for example via the variable pitch mechanism such that the second thrust V2 generated by each of these two second propulsion units 750FP, 750FS, has a vertical thrust component, but in mutually opposite directions. The pair of forward port and starboard second propulsion units 750FP, 750FS, are operated such that the vertical thrust component provided by the port second propulsion units 750FP is in the upward direction, while the horizontal thrust component provided by the starboard second propulsion unit 750FS is in the downward direction. Due to the moment arm provided by span SN, the couple generated by the vertical thrust components provided by the two front second propulsion units provides a positive roll moment to the air vehicle 10. To induce a negative roll moment, the same procedure can be adopted, mutatis mutandis, with the difference that this time the pair of forward port and starboard second propulsion units 750FP, 750FS, are operated such that the vertical thrust component provided by the starboard second propulsion units 750FS is in the upward direction while the vertical thrust component provided by the port second propulsion unit 750FP is in the downward direction. In this manner, the forward port and starboard second propulsion units 750FP, 750FS, can be operated to provide the control moments while the air vehicle is in vectored thrust mode, in either takeoff, landing or hover. It is also to be noted that the forward port and starboard second propulsion units 750FP, 750FS, can be operated in this manner to provide the control moments while the air vehicle is in powered aerodynamic flight mode, with for example the aft port and starboard second propulsion units 750AP, 750AS, providing the necessary thrust for forward flight.

Furthermore, the second set 700 of second propulsion units 750 are further configured to optionally selectively provide supplementary vertical thrust, for example in situations such as: emergency scenarios where one of more first propulsion unit 650 are malfunctioning or inoperative; high altitude takeoff/landing sites; extended hover; excess payload weight. For example, in one such emergency scenario in which one or more of the first propulsion units 650 is incapable of generating vertical thrust, the forward port and starboard second propulsion units 750FP, 750FS, can be operated to provide vertical thrust to supplement the diminished thrust of the first propulsion unit 650, while the aft port and starboard second propulsion units 750AP, 750AS, can be operated to provide control moments such as in pitch for example.

Figure 9:
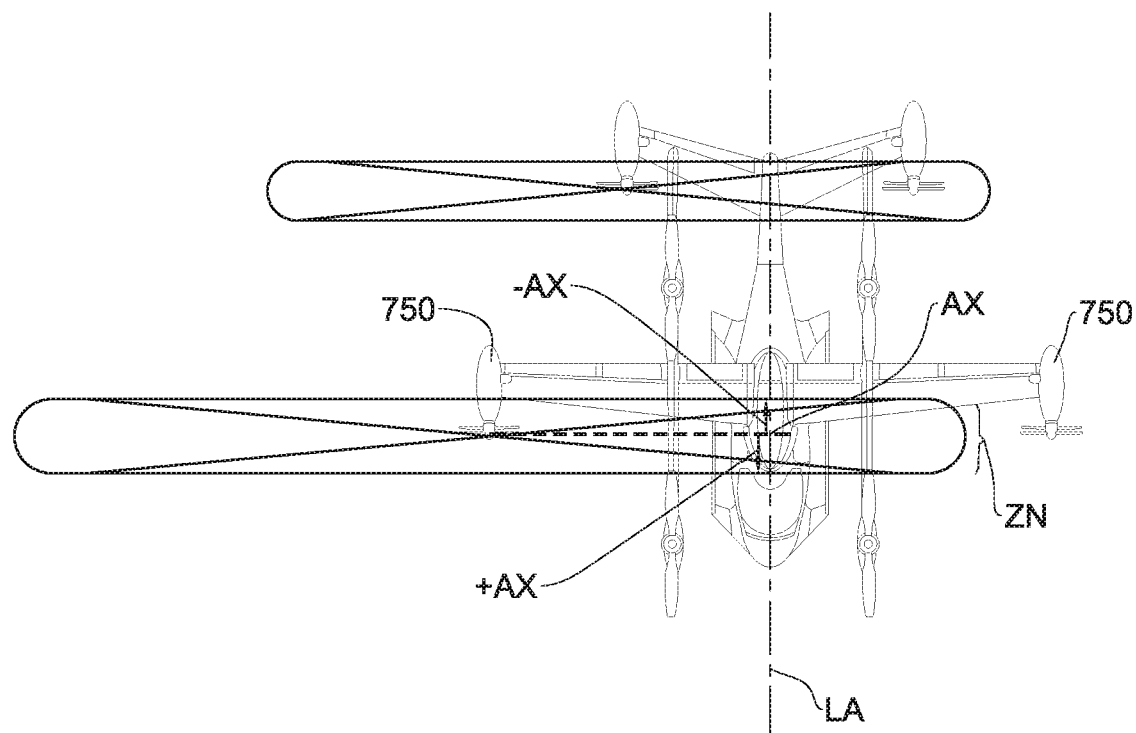
FIG. 9 is another top view of the example of FIG. 1 in powered aerodynamic flight mode.
Figure 10:
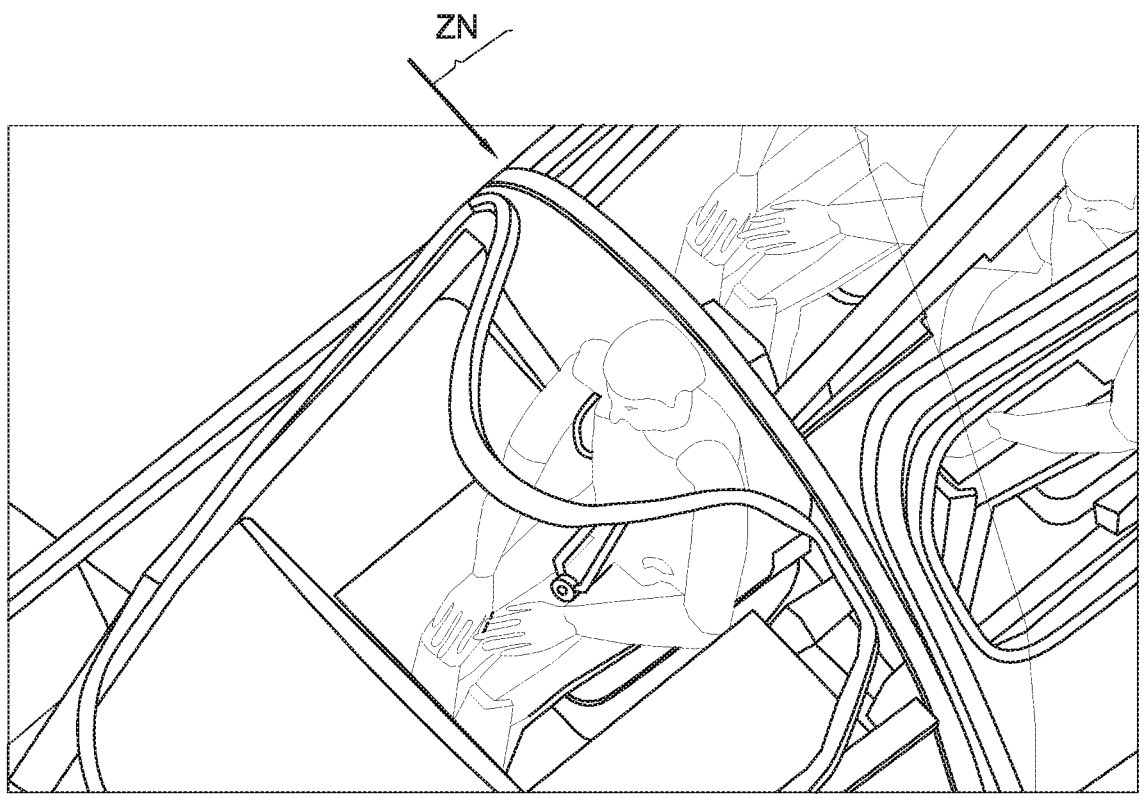
FIG. 10 is front/top/side isometric partial view of the cockpit area of example of FIG. 1.

According to another aspect of the presently disclosed subject matter, and referring in particular to FIGS. 9 and 10, the cockpit 130 is positioned with respect to the rest of the airframe 100 such as to provide a measure of safety in an event of a so called "rotor burst" occurring with respect to the front second propulsion units 750 (for example the forward port second propulsion units 750FP and/or the starboard second propulsion units 750FS). For example, in the case of such a "rotor burst" in which part or all of the blades of a front second propulsion units 750 become detached and have a certain probability to hit the airframe 100, if so within a zone ZN having a longitudinal spacing ±LX from the axial location AX of the front second propulsion units 750 along the longitudinal axis LA. According to this aspect of the presently disclosed subject matter, the axial position of the cockpit 130 and especially the pilot, is forward of the zone ZN.

In at least one implementation of the first example, the air vehicle 10 is configured as a manned aircraft, for example for use as an "air taxi" capable of landing and taking off from urban and other locations to pick up and deliver passengers over a plurality of relatively short distances. In such an implementation of the first example, the air vehicle 10 can be configured for carrying 1 pilot and up to 4 passengers, have an unpressurised cockpit/passenger cabin, and configured for short haul flights, for example range of between about 25 miles and about 60 miles. In such an example the gross take-off weight can be about 2,800 Kg, in which about 435 Kg can assigned for the pilot and passengers, while the remainder 2,365 Kg is the empty weight of the air vehicle 10. Such an air vehicle 10 can have a cruise speed of about 120 knots. Referring to FIGS. 3, 4, 5 and 8, such an air vehicle 10 can have, for example: a total wingspan of about 12 m (i.e., the wing span S of each wing being 6 m); wing area about 13.1 $m^2$; width SM of about 12.7 m; fuselage length about 9 m; maximum axial length LM of 11.28 m; height HM of about 2.87 m; spacing HL of about 0.38 m; lateral spacing D1 of about 4.29 m; longitudinal spacing L1 of about 5.55 m; longitudinal spacing L2 of about 5.27 m; longitudinal spacing L3 of about 3.40 m; longitudinal spacing L4 of about 2.15 m; spacing SN of about 3.10 m.

While in such an implementation of the above example such an air vehicle 10 can have a cruise altitude of about 1,000 feet, in other examples the cruise altitude can be much higher.

In such an implementation of the example of the air vehicle 10, and by way of non-limiting example, each of the first propulsion units 650 has two electric motors (each of which can be power rated at 95 kW), each electric motor having coupled thereto two blades with a rotor diameter provided by the blades of about 3.2 m.

In such an implementation of the example of the air vehicle 10, and by way of non-limiting example, each of the second propulsion units 750 has two electric motors (each of which can be power rated at 65 kW) each electric motor having coupled thereto three blades with a rotor diameter provided by the blades of about 1.7 m.

In such an implementation of the example of the air vehicle 10, and by way of non-limiting example, each of the first propulsion units 650 and each of the second propulsion units 750 can include at least one MAGiDRIVE integrated motor/controller, provided by MAGicALL, USA, of the appropriate power rating. In such an example, the batteries for powering the propulsion system 500 can be rated at 300 Watt*hr/kg (pack level).

According to an aspect of the presently disclosed subject matter, the first propulsion units 650 and the second propulsion units 750 are optimized, in terms of power output, simplicity of design, weight and functionality, for the following functions: The first set 600 of first propulsion units 650 are optimized for providing vertical thrust for the VT function, and for this purpose the first propulsion units 650 are non-pivotable and are of fixed pitch and relatively large rotor diameter. Furthermore, the first set 600 of first propulsion units 650 are optimized for providing a maximum combined vertical thrust that balances the gross take-off weight of the air vehicle 10 and furthermore allows the air vehicle 10 to climb at a predetermined minimum climb rate. For example such a predetermined minimum climb rate can be about 500 feet/minute. Optionally, and in emergency scenarios, the first set 600 of first propulsion units 650 can be operated to provide limited control and stability functions when the first propulsion units 650 can be controlled individually for this purpose.

The forward port and starboard second propulsion units 750FP, 750FS, of the second set of the second propulsion units 750 are optimized for providing full propulsion for the HT function, and also for providing vectored control moments in roll and yaw during vectored thrust mode and transition mode. The forward port and starboard second propulsion units 750FP, 750FS, are also optimized to supplement vertical thrust during VT function, to aid in accelerating the air vehicle vertically to the desired or predetermined minimum climb rate or above this; for this purpose, the forward port and starboard second propulsion units 750FP, 750FS, are operated to generate significantly less than the maximum available thrust, to leave a margin of usable thrust for providing the above control moments.

The aft port and starboard second propulsion units 750AP, 750AS, of the second set of the second propulsion units 750 are optimized for providing vectored control moments in pitch during vectored thrust mode and transition mode. The aft port and starboard second propulsion units 750AP, 750AS, are also optimized to supplement horizontal thrust during HT function if required, and also to provide back-up vectored control moments in roll and/or yaw in the event of failure or malfunction of the forward port and starboard second propulsion units 750FP, 750FS, in providing such control moments. Optionally, the aft port and starboard second propulsion units 750AP, 750AS, can be optimized to provide all of, or to supplement, vectored control moments in roll and/or yaw during transition.

Figure 11:
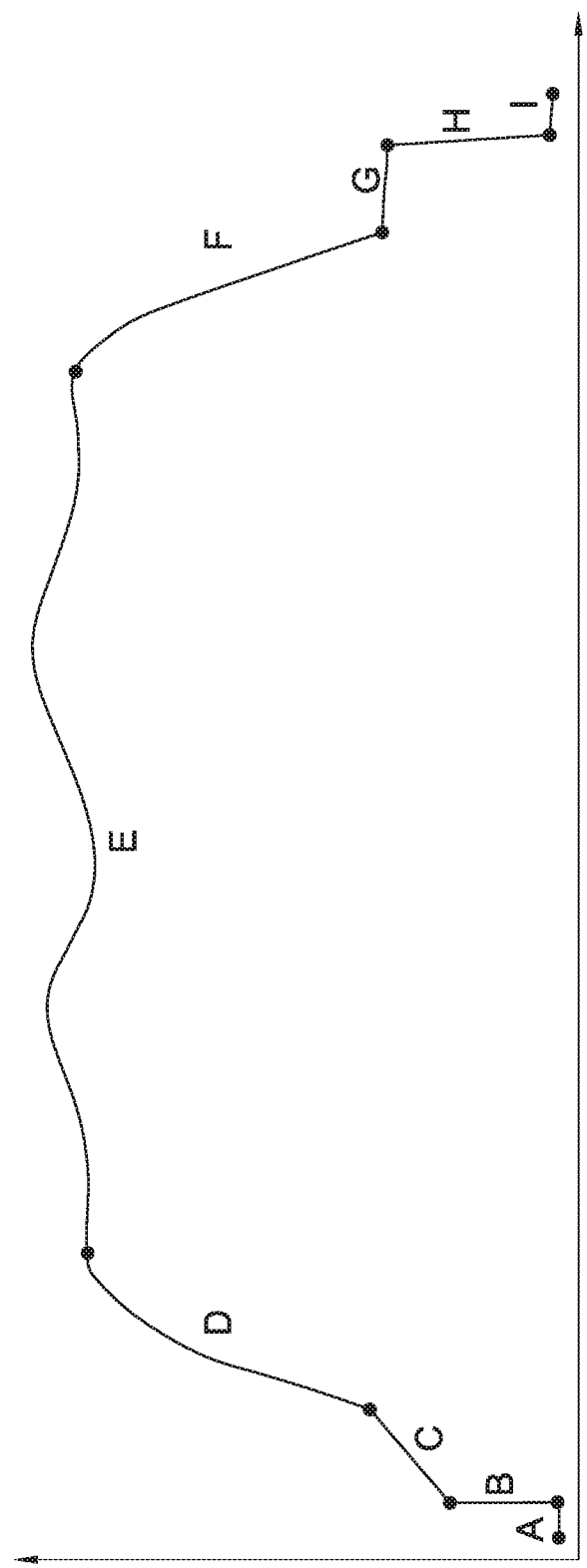
FIG. 11 schematically illustrates the variation of altitude with range for an exemplary mission for the example of FIG. 1, including vertical take-off and vertical landing.
Figure 12:
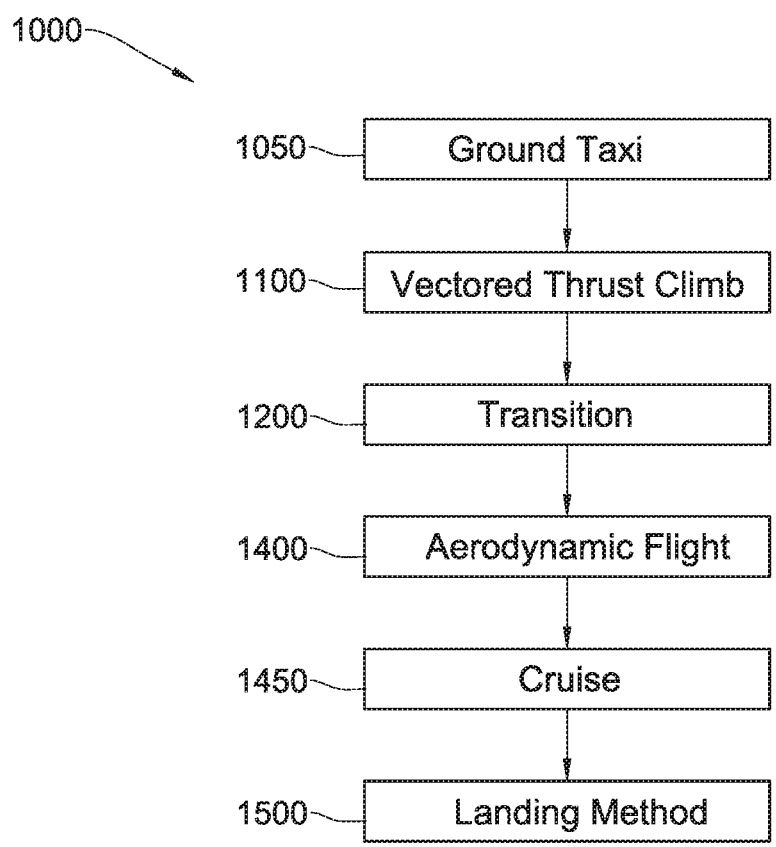
FIG. 12 schematically illustrates an example of a vertical take-off method for operating the example of FIG. 1.

Referring to FIGS. 11 and 12, the air vehicle 10 can be operated, for example, according to the following vertical take-off method 1000.

Prior to take-off, the second propulsion units 750 are pivoted to the respective vertical positions, if not already at these positions.

In the first step 1100, referred to as the vectored thrust climb step, the propulsion system 500 operates to provide the VT function. Specifically, the first set 600 of first propulsion units 650 is operated to provide the nominal maximum thrust, such that the gross take-off weight of the air vehicle 10 is balanced by the aggregate thrust TA1 provided by the four first propulsion units 650. In this example, the maximum aggregate thrust TA1 provided by the four first propulsion units 650 is also sufficient to allow the air vehicle 10 to attain a predetermined minimum climb rate. However, concurrently, or in sequence, the forward port and starboard second propulsion units 750FP, 750FS, can operated to provide respective additional vertical thrusts T2, for example each at 50% of the corresponding maximum thrust output of the forward port and starboard second propulsion units 750FP, 750FS, and this can accelerate the air vehicle to attain the predetermined minimum climb rate must faster.

The air vehicle 10 thus begins an ascent at a climb rate determined by the magnitude of the vertical thrusts T2 provided by the forward port and starboard second propulsion units 750FP, 750FS—marked "B" in FIG. 11. For example the climb rate can be in the range of 0 to 500 feet/min, with the predetermined minimum climb rate being about 500 feet/min.

It is to be noted that step 1100 can optionally be preceded by taxiing step 1050, marked "A" in FIG. 11.

In addition, all the second propulsion units 750 can be operated concurrently, according to need, to provide the VC function, generating control moments in one or more pitch, yaw, roll to maintain the air vehicle 10 balanced in all axes P, R, Y, and furthermore the second propulsion units 750 can be further operated to provide additional control moments in one or more pitch, yaw and roll to maneuver the air vehicle 10 as desired.

Specifically, the forward port and starboard second propulsion units 750FP, 750FS can provide the control moments in roll and in yaw, while the aft port and starboard second propulsion units 750AP, 750AS provide the control moments in pitch.

After take-off from the ground or other surface on which the air vehicle 10 was previously resting, and when reaching a predetermined altitude, say for example, about 40 feet, the transition step 1200 begins—marked "C" in FIG. 11. This predetermined altitude can be for example an altitude at which the air vehicle 10 clears buildings, trees and other obstacles and can thereafter travel forward towards the destination.

In step 1200, there is a first transition stage in which the control and stability functions are transferred from the second propulsion units 750 to the aerodynamic control surfaces of the air vehicle, and a second transition stage in which the lift functions are transferred from the first propulsion units 650 (and optionally also the propulsion units 750) to the wings of the air vehicle 10. According to an aspect of the presently disclose subject matter the first transition stage begins to occur prior to the second transition stage, and optionally there may some overlap between the two transition stages, for example the second transition stage starts during the first transition stage.

In step 1200, the forward port and starboard second propulsion units 750FP, 750FS, are pivoted to a predetermined tilt angle, for example angle $\theta=60°$, such that the respective thrusts V2 have a forward thrust component, which allows the air vehicle to begin attaining a forward speed. In the aforesaid first transition stage, as forward speed of the air vehicle 10 increases from nominally zero, the air flow over the wings and empennage is sufficient to provide significant aerodynamic lift art at least to enable the aerodynamic control surfaces of the air vehicle 10 to begin to provide control moments. In at least this example, this forward speed is significantly less than the stall speed, for example when the wings are configured as mild stall high lift wing as disclosed in the aforementioned U.S. Pat. No. 8,109,473 or U.S. Pat. No. 7,992,827 assigned to the present assignee.

During this part of step 1200, and as soon as there is partial aerodynamic controllability in roll provided by the aerodynamic control surfaces of the wings, the first transition stage is initiated and the forward port and starboard second propulsion units 750FP, 750FS, are then fully pivoted to the horizontal positions to give forward propulsion and still concurrently provide vectored thrust controllability in yaw. Concurrently, the aft port and starboard second propulsion units 750AP, 750AS are still in the vertical position and continue to provide the required control moments in pitch.

As the speed of the air vehicle 10 continues to increase, the aerodynamic control surfaces of the air vehicle 10 provide a greater proportion of the required control moments, and concurrently the second propulsion units 750 provide a correspondingly diminished proportion of the required control moments.

Specifically, the forward port and starboard second propulsion units 750FP, 750FS can provide the required proportion of the control moments in roll and in yaw, while the aft port and starboard second propulsion units 750AP, 750AS provide the required proportion of the control moments in pitch. Alternatively, the aft port and starboard second propulsion units 750AP, 750AS exclusively provide the required proportion of the control moments in pitch, and also provide part of the required proportion of the control moments in roll and/or yaw, and the forward port and starboard second propulsion units 750FP, 750FS supplement the required proportion of the control moments in roll and/or yaw. Alternatively, the aft port and starboard second propulsion units 750AP, 750AS exclusively provide the required proportion of the control moments in pitch, and supplement the required proportion of the control moments in roll and/or yaw provided by forward port and starboard second propulsion units 750FP, 750FS.

In examples where the pivot axes 760P and 760S are displaced longitudinally from the center of gravity CG, the forward port and starboard second propulsion units 750FP, 750FS can optionally supplement the required proportion of the control moments in pitch.

As the aerodynamic control surfaces of the air vehicle 10 achieve full controllability, the first transition stage is completed and the aft port and starboard second propulsion units 750AP, 750AS are pivoted to the horizontal position to provide further forward propulsion to the air vehicle 10.

The second transition stage begins during the first transition stage, and as soon as the wings begin to develop significant lift. As the forward speed of the air vehicle increases, the wings provide a greater proportion of the lift, and concurrently the first propulsion units 650 provide a correspondingly diminished proportion of the required lift force. As the speed of the air vehicle 10 reaches a minimum speed the air vehicle 10 achieves full aerodynamic lift, the second transition stage is completed and the first second propulsion units 650 are turned off, and their respective propellers aligned and locked in the longitudinal direction. This minimum speed can be, for example 20% higher than the stall speed, i.e., $1.2*V_{stall}$, and the air vehicle 10 is configured to provide a suitable angle of attack such as to enable the wings to provide the required lift at this minimum speed During step 1200, the air vehicle 10 can continue to climb, for example to an altitude of 300 feet, or can maintain altitude.

The air vehicle 10 is suitably configured for dovetailing the contributions of the second propulsion units 750 and the control surfaces towards the stability and control functions. For example, suitable sensors, for example accelerometers, can be provided in the air vehicle 10 to provide feedback data regarding the actual control moments applied to the air vehicle 10, and works out how much contribution to the control moments is required to be provided by the second propulsion units 750 for a given required maneuver or stability requirement to supplement the control moments provided by the aerodynamic control surfaces.

At the end of step 1200, the propulsion system 500 now provides the HT function and the aerodynamic control surfaces provide the HC function, marked "D" in FIG. 11 and in the next step 1400 the air vehicle 10 can be operated solely in powered aerodynamic flight mode, enabling the air vehicle 10 to climb, accelerate, maneuver and attain distance from the starting point, for example an altitude of 1000 feet, airspeed of 150 knots. For example, in step 1450, marked "E" in FIG. 11, the air vehicle 10 can cruise to the required range, for example 25 miles to 60 miles.

Figure 13:
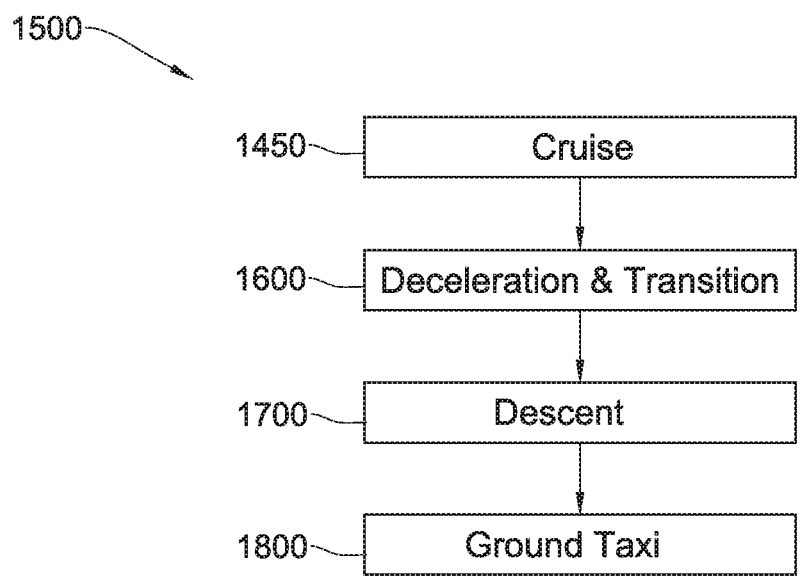
FIG. 13 schematically illustrates an example of a vertical landing method for operating the example of FIG. 1.

Referring to FIGS. 11 and 13, the air vehicle 10 can be operated, for example, according to vertical landing method 1500.

Prior to implementing the vertical landing method 1500, the air vehicle 10 is in powered aerodynamic flight mode, step 1450, for example in cruise at a desired altitude (for example at a cruise speed of about 150 knots and altitude 1000 feet), marked "F" in FIG. 11.

The first step 1600 of the method 1500 is the step of decelerating and reaching a point at a predetermined altitude above the landing point, marked "G" in FIG. 11. At the start of this step, and with all the first propulsion units 650 still turned off, and their propellers locked and still parallel to the longitudinal axis LA, the air vehicle 10 provides the HT function and the HC function, and is still operated solely in powered aerodynamic flight mode. Step 1600 is also a transition from powered aerodynamic flight and vectored powered flight mode.

Concurrently, at the beginning of step 1600, the aft port and starboard second propulsion units 750AP, 750AS, are then fully pivoted to the vertical positions to enable providing vectored thrust controllability in pitch and optionally in roll and/or yaw.

Concurrently, the forward port and starboard second propulsion units 750FP, 750FS, while still in the horizontal position, are now operated, via pitch control of the respective propellers, to provide reverse thrust, and thereby reduce the forward speed of the air vehicle 10, eventually to zero.

It is to be noted that during step 1600, the pitch of the forward port and starboard second propulsion units 750FP, 750FS, can be controlled to provide forward thrust or reverse thrust, to thereby enable the air vehicle 10 to be precisely maneuvered and thereby attain a position at a desired altitude above the desired landing point.

As the speed of the air vehicle 10 continues to decrease, the aerodynamic control surfaces of the air vehicle 10 provide a lesser proportion of the required control moments, and concurrently the second propulsion units 750 provide a correspondingly increased proportion of the required control moments. In particular, the aft port and starboard second propulsion units 750AP, 750AS in their vertical position can provide vectored control moments in pitch, yaw and/or roll. As the forward speed reduces further, and the proportion of the control moments potentially providable by the aerodynamic control surfaces is further reduced, the forward port and starboard second propulsion units 750FP, 750FS, are pivoted towards the vertical position, for example having an angle $\theta=60°$, to thereby supplement the control moments at least in roll provided by the aft port and starboard second propulsion units 750AP, 750AS.

As the aerodynamic control surfaces of the air vehicle 10 lose the ability for controllability, and when the air vehicle 10 is at the desired position at the desired altitude above the desired landing point, the forward port and starboard second propulsion units 750FP, 750FS, are pivoted fully to the vertical position, and the second propulsion units 750 provide full controllability to the air vehicle 10, to maintain the desired position at the desired altitude above the desired landing point.

During step 1600, as the speed of the air vehicle 10 continues to decrease, the aerodynamic lift generated by the wings of the air vehicle 10 also starts to diminish, so that by itself it cannot balance the gross weight of the air vehicle. At this point, the first propulsion units 650 are turned on, their propellers having been first unlocked from their locked positions parallel to the longitudinal axis LA. As the aerodynamic lift generated by the wings of the air vehicle 10 provide a lesser proportion of the required lift, concurrent with the forward speed of the air vehicle diminishing, the first propulsion units 650 concurrently provide a correspondingly increased proportion of the required vertical thrust to maintain the air vehicle 10 at the desired height. In this example, the desired height can be kept constant during the transition step 1600.

In the next step 1700, marked "H" in FIG. 11, the descent and landing step, the thrust provided by the first propulsion units 650 is reduced to be less than the gross weight of the air vehicle 10. At this point, the second propulsion units 750 provide full controllability to the air vehicle 10, but no significant net vertical thrust, and thus the air vehicle 10 begins to descend towards then landing point. The descent speed is determined by the difference between the thrust provided by the first propulsion units 650 and the gross weight of the air vehicle 10. If desired the thrust provided by the first propulsion units 650 can be increased to equal or exceed the gross weight of the air vehicle 10, to control the decent rate, and/or to hover, and/or to increase the altitude of the air vehicle 10.

The air vehicle 10 is then operated to descend to zero feet altitude and thus land at the touchdown point.

It is to be noted that step 1700 can optionally be followed by taxiing step 1800, marked "I" in FIG. 11.

Operating the air vehicle 10 for STOL take-off and landing is similar to the method of operating air vehicle 10 for VTOL take-off and landing, respectively, mutatis mutandis, with the main difference being that from just after commencing take-off and until landing and coming to a stop, the air vehicle 10 continuously has a forward speed that can vary.

Figure 14:
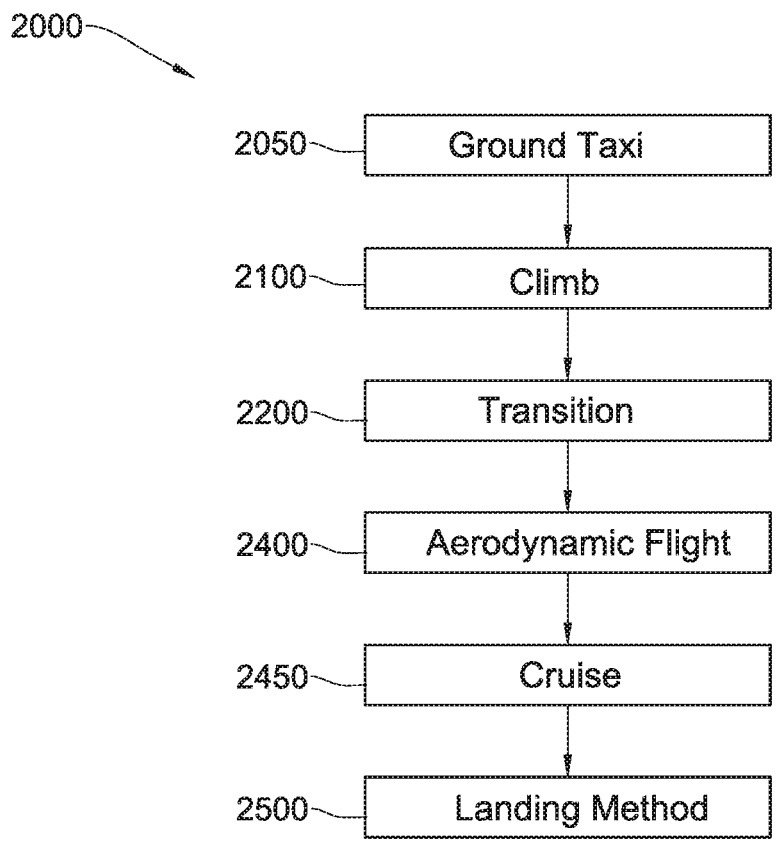
FIG. 14 schematically illustrates an example of a short take-off method for operating the example of FIG. 1.

For example, referring to FIG. 14, the air vehicle 10 can be operated according to the following STOL take-off method 2000.

It is to be noted that step 2100 can optionally be preceded by taxiing step 2050.

Prior to STOL take-off, the second propulsion units 750 are pivoted to the horizontal positions, if not already at these horizontal positions.

In the first step 2100, referred to as the climb step, the first set 600 of first propulsion units 650 is not in operation, and all four second propulsion units 750 are operated to provide forward thrust at full power. Accordingly, the air vehicle 10 begins to move along the ground and gather forward speed.

When the air vehicle 10 reaches a point along the ground where it is desired to take-off from the ground, the aft port and starboard second propulsion units 750AP, 750AS are pivoted to the respective vertical positions, and concurrently the thrust output is reduced to nominally zero, such that the aft port and starboard second propulsion units 750AP, 750AS can provide at least control moments in pitch.

Concurrently the first set 600 of first propulsion units 650 is operated to provide full power and thus maximum vertical thrust, and the air vehicle 10 thus takes off from the ground surface and begins an ascent at a climb rate determined by the magnitude of the vertical thrusts provided by the first set 600 of first propulsion units 650 as well as the increasing lift generated by the wings.

After take-off from the ground, and in step 2200, there is a first transition stage in which the control and stability functions are transferred fully from the second propulsion units 750 to the aerodynamic control surfaces of the air vehicle, and a second transition stage in which the contribution of the lift functions provided the first propulsion units 650 are fully transferred to the wings of the air vehicle 10.

In step 2200, and in the aforesaid first transition stage, as forward speed of the air vehicle 10 increases from take-off speed, the air flow over the wings and empennage is sufficient to provide significant aerodynamic lift at at least to enable the aerodynamic control surfaces of the air vehicle 10 to begin to provide control moments. In at least this example, this forward speed is significantly less than the stall speed, for example when the wings are configured as mild stall high lift wing as disclosed in the aforementioned U.S. Pat. No. 8,109,473 or U.S. Pat. No. 7,992,827 assigned to the present assignee.

During this part of step 2200, and as soon as there is minimum aerodynamic controllability in roll provided by the aerodynamic control surfaces of the wings, the first transition stage is initiated and the aft port and starboard second propulsion units 750AP, 750AS, are then fully pivoted to the horizontal positions to give additional forward propulsion and still concurrently provide vectored thrust controllability in yaw. Concurrently, the forward port and starboard second propulsion units 750FP, 750FS are still in the horizontal positions and continue to provide the respective forward thrust.

As the aerodynamic control surfaces of the air vehicle 10 achieve full controllability, the first transition stage is completed and the aft port and starboard second propulsion units 750AP, 750AS continue in the horizontal position to provide forward propulsion to the air vehicle 10.

The second transition stage begins during the first transition stage, and as soon as the wings begin to develop significant lift. As the forward speed of the air vehicle increases, the wings provide a greater proportion of the lift, and concurrently the first propulsion units 650 provide a correspondingly diminished proportion of the required lift force.

During step 2200, the air vehicle 10 can continue to climb, for example to an altitude of 300 feet, or can maintain altitude. As the speed of the air vehicle 10 reaches a minimum speed the air vehicle 10 achieves full aerodynamic lift, the second transition stage is completed.

Figure 15:
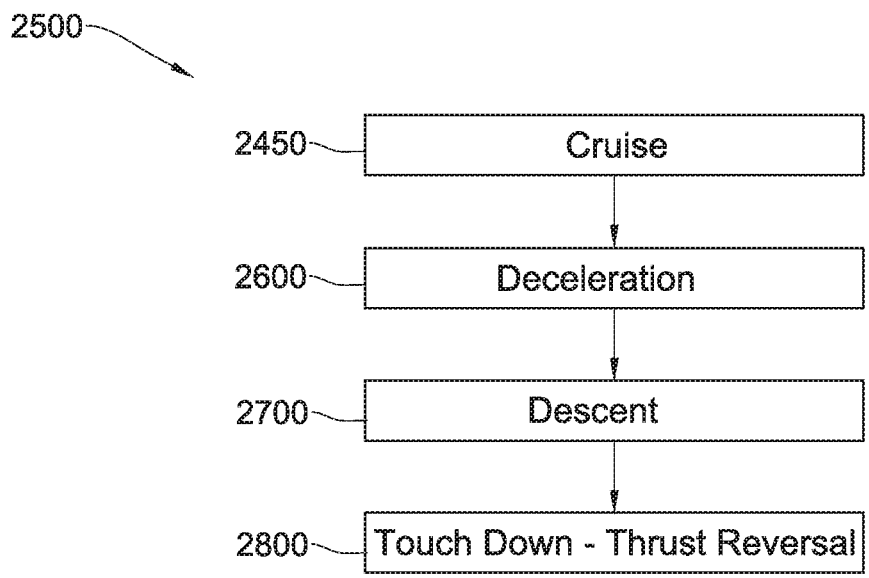
FIG. 15 schematically illustrates an example of a short landing method for operating the example of FIG. 1.

In the next step 2400, and after the air vehicle 10 has reached the minimum speed, the air vehicle 10 can be operated solely in powered aerodynamic flight mode, enabling the air vehicle 10 to climb, accelerate, maneuver and attain distance from the starting point, for example an altitude of 1000 feet, airspeed of 150 knots. For example, in step 2450, the air vehicle 10 can cruise to the required range, for example 25 miles to 60 miles. At the beginning of step 2400 the first second propulsion units 650 are turned off, and their respective propellers aligned and locked in the longitudinal direction. This minimum speed can be, for example 20% higher than the stall speed, i.e., $1.2*V_{stall}$, and the air vehicle 10 is configured to provide a suitable angle of attack such as to enable the wings to provide the required lift at this minimum speed Referring to FIG. 15, the air vehicle 10 can be operated, for example, according to STOL landing method 2500.

Prior to implementing the STOL landing method 2500, the air vehicle 10 is in powered aerodynamic flight mode, step 2450, for example in cruise at a desired altitude (for example at a cruise speed of about 150 knots and altitude 1000 feet).

The first step 2600 of the method 2500 is the step of decelerating and reaching a point at a predetermined altitude and distance from the desired the landing point. At the start of this step, and with all the first propulsion units 650 still turned off, and their propellers locked and still parallel to the longitudinal axis LA, the air vehicle 10 provides the HT function and the HC function, and is still operated solely in powered aerodynamic flight mode. Concurrently, at the beginning of step 2600, the aft port and starboard second propulsion units 750AP, 750AS, are fully pivoted to the vertical positions to enable providing vectored thrust controllability in pitch and optionally in roll and/or yaw. Concurrently, the forward port and starboard second propulsion units 750FP, 750FS, while still in the horizontal position, are now operated, via pitch control of the respective propellers, to provide reduced thrust, optionally including providing thrust reversal, and thereby reduce the forward speed of the air vehicle 10.

As the speed of the air vehicle 10 continues to decrease, the aerodynamic control surfaces of the air vehicle 10 provide a lesser proportion of the required control moments, and concurrently the second propulsion units 750 provide a correspondingly increased proportion of the required control moments. In particular, the aft port and starboard second propulsion units 750AP, 750AS in their vertical position can provide vectored control moments in pitch, yaw and/or roll. As the forward speed reduces further, and the proportion of the control moments potentially providable by the aerodynamic control surfaces is further reduced, the forward port and starboard second propulsion units 750FP, 750FS, can optionally be pivoted towards the vertical position, for example having an angle $\theta=60°$, to thereby supplement the control moments at least in roll provided by the aft port and starboard second propulsion units 750AP, 750AS.

During step 2600, as the speed of the air vehicle 10 continues to decrease, the aerodynamic lift generated by the wings of the air vehicle 10 also starts to diminish, so that by itself it cannot balance the gross weight of the air vehicle. At this point, the first propulsion units 650 are turned on, their propellers having been first unlocked from their locked positions parallel to the longitudinal axis LA. As the aerodynamic lift generated by the wings of the air vehicle 10 provide a lesser proportion of the required lift, concurrent with the forward speed of the air vehicle diminishing, the first propulsion units 650 concurrently provide a correspondingly increased proportion of the required vertical thrust.

In the next step 2700, the descent and landing step, the thrust provided by the first propulsion units 650 is gradually reduced. At this point, the air vehicle 10 begins to descend towards the landing point, and eventually lands on the ground with a forward speed.

Immediately on touch-down, in step 2800, the aft port and starboard second propulsion units 750AP, 750AS are pivoted to the respective horizontal position, and all the second propulsion units are operated to generate maximum thrust but in the forward direction, for example by controlling the pitch of the propellers, thereby providing reverse thrust to the air vehicle 10 which then comes to a stop.

In alternative variations of the above examples and in other examples, the first set of first propulsion units can include only three first propulsion units or more than four first propulsion units, symmetrically disposed with respect to the longitudinal axis LA. Additionally or alternatively, the second set of second propulsion units can include only three second propulsion units or more than four second propulsion units, symmetrically disposed with respect to the longitudinal axis LA. However, at least some of the above features, including redundancy features, ease of operation features, and safety features provided by the illustrated example with four second propulsion units are not present with the second set having only three second propulsion units.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. An air vehicle configured for being operated in vectored flight mode and in powered aerodynamic flight mode, the air vehicle having a longitudinal axis and center of gravity, and comprising:
- an airframe comprising aerodynamic lift-generating wings for enabling operation of said air vehicle in said powered aerodynamic flight mode;
- a propulsion system, configured for providing propulsion to said air vehicle in said powered aerodynamic flight mode and said vectored flight mode, and for providing stability and control to said air vehicle in said vectored flight mode, and comprising a set of first propulsion units and a set of second propulsion units, wherein:

said set of first propulsion units comprising at least three said first propulsion units, said first propulsion units being arranged in polygonal arrangement with respect to the airframe, said polygonal arrangement enclosing the center of gravity when the air vehicle is viewed in plan view;
- said first propulsion units being non-pivotably attached with respect to said airframe to provide a fixed vertical thrust vector with respect thereto,
- said set of first propulsion units configured to provide an aggregate vertical thrust sufficient for providing said vectored flight mode;
- said set of second propulsion units comprising at least three said second propulsion units, each said second propulsion unit being arranged in spaced relationship with respect to the center of gravity when viewed in plan view such that said set of second propulsion units comprises one or more forward mounted said second propulsion units and correspondingly one or more aft mounted said second propulsion units, said set of second propulsion units being further configured to provide vectored control moments to the air vehicle in three rotational degrees of freedom;
- said second propulsion units each being pivotably attached with respect to said airframe to enable angular displacement of a respective thrust vector at least between a respective vertical position and a respective horizontal position with respect thereto,
said set of second propulsion units configured to provide at least an aggregate horizontal thrust sufficient for providing said powered aerodynamic flight mode;
wherein the air vehicle is further configured for enabling the one or more forward mounted second propulsion units to be pivoted independently of the correspondingly one or more aft mounted second propulsion units;
and wherein said aft mounted second propulsion units have a first moment arm with respect to the center of gravity, and wherein said forward mounted second propulsion units have a second moment arm with respect to the center of gravity, said first moment arm being greater than said second moment arm.

2. The air vehicle according to claim 1, wherein said airframe comprises an empennage, and wherein said wings include a port wing and starboard wing.

3. The air vehicle according to claim 1, wherein said set of first propulsion units are operable to provide propulsion and an absence of stability and control to said air vehicle in said vectored flight mode.

4. The air vehicle according to claim 1, wherein said set of first propulsion units comprises two said first propulsion units forward of said wings and two said first propulsion units aft of said wings, and wherein two said first propulsion units are on a starboard side of said center of gravity and wherein another two said first propulsion units are on a port side of said center of gravity.

5. The air vehicle according to claim 1, wherein said set of second propulsion units are operable to exclusively provide for said propulsion system said stability and control to said air vehicle in said vectored flight mode.

6. The air vehicle according to claim 1, wherein said set of second propulsion units are operable to provide propulsion to said air vehicle in said powered aerodynamic flight mode.

7. The air vehicle according to claim 1, including at least one of:
wherein said set of second propulsion units comprises two said aft said mounted second propulsion units spaced aft of said wings,
wherein said set of second propulsion units comprises four said second propulsion units, and wherein said set of second propulsion units comprises two said aft mounted second propulsion units spaced aft of said center of gravity, one said aft second propulsion unit on a starboard side of said center of gravity and another said aft mounted second propulsion units on a port side of said center of gravity.

8. The air vehicle according to claim 2, wherein said set of second propulsion units comprises two said aft said second propulsion units pivotably mounted to said empennage.

9. The air vehicle according to claim 2, wherein said empennage is in the form of a V-tail configuration, including a port stabilizer and starboard stabilizer, wherein one said aft mounted second propulsion unit is pivotably mounted to said port stabilizer and wherein another said aft mounted second propulsion unit is pivotably mounted to starboard stabilizer.

10. The air vehicle according to claim 7, wherein said two aft mounted second propulsion units are operable to exclusively provide said stability and control in pitch for said propulsion system in said vectored flight mode.

11. The air vehicle according to claim 7, wherein said two aft mounted second propulsion units are operable to provide said stability and control in at least one of yaw and roll for said propulsion system in said vectored flight mode.

12. The air vehicle according to claim 7, wherein said two aft mounted second propulsion units are separately operable to selectively control at least one of:
a level of thrust generated by the respective said aft second mounted propulsion unit; and
a pivot angle the respective said aft mounted second propulsion unit;
to thereby generate control moments in any one of pitch, roll and yaw to provide said stability and control.

13. The air vehicle according to claim 1, wherein said second propulsion units are pivotable at least between a vertical position and a horizontal position, wherein in said horizontal position at least some of said second propulsion units can be operated to provide thrust for propulsion in said powered aerodynamic flight mode, and wherein in said vertical position at least some of said second propulsion units can be operated to provide thrust for propulsion in said vectored flight mode.

14. The air vehicle according to claim 2, wherein one said forward mounted second propulsion unit is pivotably mounted to said port wing and wherein another said forward mounted second propulsion unit is pivotably mounted to starboard wing, and wherein said two forward mounted second propulsion units are operable to exclusively provide said stability and control in at least roll for said propulsion system in transition from said vectored flight mode to said aerodynamic flight mode.

15. The air vehicle according to claim 14, wherein said forward mounted second propulsion units are operable to provide said stability and control in at least one of yaw and roll for said propulsion system in said vectored flight mode.

16. The air vehicle according to claim 14, wherein said two forward mounted second propulsion units are separately operable to selectively control at least one of:
a level of thrust generated by the respective said forward mounted second propulsion unit; and
a pivot angle the respective said forward mounted second propulsion unit;
to thereby generate control moments in any one of pitch, roll and yaw to provide said stability and control.

17. A method for operating an air vehicle, the air vehicle being as defined in claim 1, and comprising operating the air vehicle for VTOL take off, the method comprising the following steps:
(a) vectored thrust climb step, including:
operating the propulsion system in vectored thrust mode to cause the air vehicle to lift off and climb from a surface using vertical thrust generated by the propulsion system;
concurrently operating the set of second propulsion units to exclusively provide stability and control to the air vehicle;
(b) transition step, including operating the set of second propulsion units to provide a forward speed to the air vehicle and concurrently transition the air vehicle from vectored thrust flight mode to powered aerodynamic flight mode;
(c) aerodynamic flight step, including:
operating the set of second propulsion units to exclusively provide propulsion for powered aerodynamic flight mode.

18. The method according to claim 17, in which step (a) comprises at least one of:
operating the set of first propulsion units to provide a nominal maximum thrust, such as to at least exceed a gross take-off weight of the air vehicle sufficiently to provide a predetermined climb rate;

operating the set of first propulsion units to provide a nominal maximum thrust, such as to at least exceed a gross take-off weight of the air vehicle sufficiently to provide a predetermined climb rate, and operating the set of second propulsion units to provide a corresponding vertical thrust to accelerate the air vehicle to attain the predetermined climb rate.

19. The method according to claim 17, wherein step (b) comprises:
a first transition stage, in which the stability and control of the air vehicle is transferred from the second propulsion units to aerodynamic control surfaces of the air vehicle, and
a second transition stage in which the lift functions are transferred from the first propulsion units and optionally the second propulsion units to the wings of the air vehicle.

20. The method according to claim 19, wherein said second transition stage starts during the first transition stage.

21. The method according to claim 17, wherein step (b), at least some of the second propulsion units are pivoted to provide a horizontal thrust component for propulsion.

22. The method according to claim 19, wherein in step (c) the aerodynamic control surfaces exclusively provide stability and control to the air vehicle, and wherein in step (c) the set of first propulsion units is not operational.

23. A method for operating an air vehicle, the air vehicle being as defined in claim 1, and comprising operating the air vehicle for VTOL landing, the method comprising the following steps:
(d) deceleration step, including:
operating the propulsion system to reduce the forward speed of the air vehicle to zero,
operating the set of second propulsion units to concurrently transition the air vehicle from powered aerodynamic flight mode to vectored thrust flight mode,
(e) descent step, including operating the set of first propulsion units to provide a vertical thrust with respect to a gross landing weight of the air vehicle to enable the vehicle to descend to a landing point at a predetermined landing rate.

24. The method according to claim 23, in which step (e) comprises operating the set of first propulsion units to provide a nominal maximum thrust, less than the gross landing weight of the air vehicle sufficiently to enable the air vehicle to attain said predetermined landing rate.

25. The method according to claim 23, in which step (d) comprises:
transferring the stability and control of the air vehicle from aerodynamic control surfaces of the air vehicle to the second propulsion units, and
transferring the lift functions from the wings of the air vehicle to the first propulsion units and optionally the second propulsion units.

26. The method according to claim 23, wherein at least two said second propulsion units each comprises at least one respective second rotor having at least one variable pitch propeller, and wherein step (d) comprises applying pitch control to the respective said variable pitch propellers to generate a reverse thrust.

27. The method according to claim 23, wherein step (d) comprises:
pivoting said aft mounted second propulsion units to provide an angular displacement of the respective thrust vector to a respective vertical position;
as the forward speed of the air vehicle is reduced, and a proportion of the control moments potentially providable by aerodynamic control surfaces of the air vehicle is reduced, pivoting the forward mounted second propulsion units partially towards the respective vertical position, thereby providing respective control moments to the air vehicle;
as the forward speed of the air vehicle is further reduced such that the aerodynamic control surfaces of the air vehicle become ineffective for controllability, pivoting the forward mounted second propulsion units fully towards the respective vertical position.

28. The air vehicle according to claim 1, wherein the air vehicle is configured for dovetailing respective contributions from the second propulsion units and aerodynamic control surfaces of the air vehicle towards said stability and control.

29. The air vehicle according to claim 28, wherein the air vehicle comprises sensors configured for providing feedback data regarding actual control moments applied to the air vehicle, and wherein the air vehicle is further configured for determining a level of contribution to said control moments required to be provided by said second propulsion units for a predetermined maneuver or stability requirement to supplement control moments provided by said aerodynamic control surfaces.

30. The air vehicle according to claim 1, wherein said aggregate vertical thrust provides a respective center of thrust, and wherein said center of thrust is longitudinally spaced from a center of gravity of the air vehicle.

31. The air vehicle according to claim 30, wherein said set of first propulsion units comprises forward located said first propulsion units located forward of said center of gravity, and aft located said first propulsion units located aft of said center of gravity, wherein the air vehicle is configured for operating the set of first propulsion units such that the aft located said first propulsion units provide more thrust or less thrust than the forward located said first propulsion units, according to whether the center of thrust is located forward or aft, respectively, of the center of gravity to thereby balance the air vehicle.

32. The air vehicle according to claim 1, wherein said set of second propulsion units is configured for selectively providing at least one of supplementary vertical thrust and control moments to the air vehicle.

33. The air vehicle according to claim 1,
wherein the air vehicle is further configured for operating in transition mode when transitioning between said vectored flight mode and said powered aerodynamic flight mode; and
the aft mounted second propulsion units are operated to provide control moments, and the forward mounted second propulsion units are operated to provide a horizontal thrust vector.

34. The air vehicle according to claim 33, wherein the air vehicle is further configured, in said transition mode, for selectively causing the aft mounted second propulsion units to be pivoted towards a vertical position, while concurrently the forward mounted second propulsion units are pivoted toward a horizontal position.

35. The air vehicle according to claim 1, wherein the air vehicle comprises a cabin configured for enabling passengers to be carried therein.

* * * * *